(12) United States Patent
Hisanaga et al.

(10) Patent No.: US 9,013,656 B2
(45) Date of Patent: Apr. 21, 2015

(54) POLARIZING PLATE AND LIQUID CRYSTAL DISPLAY

(71) Applicant: FUJIFILM Corporation, Tokyo (JP)

(72) Inventors: Kazuya Hisanaga, Kanagawa (JP); Rikio Inoue, Kanagawa (JP); Makoto Ishiguro, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 51 days.

(21) Appl. No.: 14/043,879

(22) Filed: Oct. 2, 2013

(65) Prior Publication Data

US 2014/0098331 A1 Apr. 10, 2014

(30) Foreign Application Priority Data

Oct. 4, 2012 (JP) ................. 2012-222481
Mar. 15, 2013 (JP) ................. 2013-053453

(51) Int. Cl.
*G02F 1/1335* (2006.01)
*G02B 5/30* (2006.01)
*G02B 1/10* (2006.01)

(52) U.S. Cl.
CPC ............ *G02F 1/133528* (2013.01); *G02B 5/30* (2013.01); *G02B 1/105* (2013.01); *G02B 5/3033* (2013.01); *G02F 2001/133562* (2013.01)

(58) Field of Classification Search
CPC ................. C08L 1/12; C02F 1/133345; C02F 1/133528; C02F 1/1335; C02F 1/1303; C02F 1/134363; C02F 2202/28; C02F 2201/50; C02F 2201/54; C02B 1/105; C02B 1/04; C02B 5/305; C02B 5/30; C02B 5/3025; C08J 5/18; C08J 2301/12; C09J 2201/606; C09J 7/0246; B32B 7/12; B32B 2307/42; B32B 2307/40; B32B 2405/00; B32B 37/0015; B32B 37/12; B29K 2001/12; B29K 2995/0034; B29D 7/01; C08B 3/06; B05D 5/10
USPC .................. 349/96, 122, 138, 141, 192, 193; 264/1.34, 291, 1.7; 428/343, 1.1; 359/483.01, 483.03; 156/60; 427/163.1, 162, 207.1
See application file for complete search history.

(56) References Cited

U.S. PATENT DOCUMENTS

| | | | |
|---|---|---|---|
| 2003/0072078 A1* | 4/2003 | Higashio et al. | 359/485 |
| 2009/0033833 A1* | 2/2009 | Aminaka | 349/68 |
| 2010/0134879 A1* | 6/2010 | Yoshihara et al. | 359/361 |

FOREIGN PATENT DOCUMENTS

JP 2008-249901 A 10/2008

* cited by examiner

*Primary Examiner* — Thoi Duong
(74) *Attorney, Agent, or Firm* — Jean C. Edwards, Esq.; Edwards Neils PLLC

(57) ABSTRACT

A polarizing plate according to the invention includes a first protective film; a polarizer; a second protective film; and an adhesive layer in this order, in which a moisture vapor permeability of the first protective film is less than or equal to 200 $g/m^2/24$ hours, the second protective film contains cellulose acylate as a major component, a creep amount of the adhesive layer is less than 100 μm, and a shrinkage force of the polarizing plate in an absorption axis direction thereof which is represented by the following expression (A) is lower than or equal to 2000 N/m. Expression (A) is the Shrinkage Force (N/m) of Polarizing Plate in Absorption Axis Direction=Elastic Modulus (GPa) of Polarizing Plate in Absorption Axis Direction×|Humidity Dimensional Change Rate (%) of Polarizing Plate in Absorption Axis Direction|× Thickness (μm) of Polarizing Plate×10.

14 Claims, 1 Drawing Sheet

POLARIZING PLATE AND LIQUID CRYSTAL DISPLAY

BACKGROUND OF THE INVENTION

1. Cross-Reference to Related Applications

This application is based upon and claims the benefit of priority from Japanese Patent Application Nos. 2012-222481, which was filed Oct. 4, 2012, and 2013-053453, which was filed Mar. 15, 2013, the contents of both of which are incorporated herein by reference in their entirety.

2. Field of the Invention

The present invention relates to a polarizing plate and a liquid crystal display.

3. Description of the Related Art

In general, a polarizing plate of a liquid crystal display has a configuration in which a transparent protective film (polarizing plate protective film) is bonded to both front and back surfaces of a polarizer, the polarizer including a polyvinyl alcohol film on which iodine or a dye is adsorbed and aligned. As the polarizing plate protective film, a film of cellulose acylate represented by cellulose acetate is widely used because this film has high transparency and can easily secure adhesion with polyvinyl alcohol which is used in the polarizer.

Along with the growth of the liquid crystal display market, performance requirements for the above-described polarizing plate have become strict. In particular, since the dimensional change of the polarizing plate caused by the effects of temperature and humidity affects an image of a liquid crystal display, this dimensional change has long been an issue.

For example, in order to solve light leakage on a screen peripheral portion of a liquid crystal display which is caused by the dimensional change of a polarizing plate along with changes in temperature and humidity, JP2008-249901A discloses a polarizing plate including two protective films and an adhesive layer, in which at least one of the two protective films is a film with low moisture permeability, and the creep amount of the adhesive layer obtained in a creep test is relatively large.

SUMMARY OF THE INVENTION

Recently, in order to reduce the weight of a liquid crystal display, the thickness of various members, particularly, the thickness of a glass substrate has been reduced. In such a liquid crystal display, particularly, a liquid crystal panel is gradually warped by a heat cycle where a high-temperature high-humidity environment and an ordinary-temperature ordinary-humidity environment are repeated. As a result, there is a problem in that light leakage occurs on four corners of the liquid crystal panel. As a countermeasure of this problem, the solving means described in JP2008-249901A is not sufficient. The adhesive layer having a relatively large creep amount is used to relax the warpage of the liquid crystal panel, but the peeling of the polarizing plate and unevenness in brightness are likely to occur. Accordingly, it is difficult to solve the peeling of the polarizing plate and unevenness in brightness while improving the warpage of the panel.

An object of the invention is to provide a polarizing plate which is capable of suppressing light leakage caused by the above-described heat cycle.

As a result of investigation, the present inventors found the following facts. When a polarizing plate is left to stand in a high-temperature high-humidity environment for a given time, the water content of a polarizing plate on a viewing side which is exposed to the outside environment is increased and the dimension thereof changes, whereas the water content and dimensional change of a polarizing plate on a backlight side are small. Then, when the polarizing plate is exposed to an ordinary-temperature ordinary-humidity environment for a given time, the drying and shrinkage of the polarizing plate on the viewing side advances, whereas the polarizing plate on the backlight side does not change. Therefore, a liquid crystal panel is gradually warped, which leads to light leakage on four corners of the liquid crystal panel.

As a result of further investigation, the present inventors found that the above-described problems can be solved by reducing the moisture vapor permeability of the polarizing plate on the viewing side to delay water absorption and drying, reducing the creep amount of the adhesive layer to suppress the expansion thereof, and suppressing the shrinkage of the polarizing plate.

That is, the above-described problems are solved by the invention having the following configurations.

[1] A polarizing plate comprising: a first protective film; a polarizer; a second protective film; and an adhesive layer in this order, wherein a moisture vapor permeability of the first protective film is less than or equal to 100 g/m$^2$/24 hours, the second protective film contains cellulose acylate as a major component, a creep amount of the adhesive layer is less than 100 μm when measured in a creep test under conditions of a temperature of 25° C., a relative humidity of 60%, a load of 1 kg, and a load applying time of 1 hour, and a shrinkage force of the polarizing plate in an absorption axis direction thereof which is represented by the following expression (A) is lower than or equal to 2000 N/m.

Shrinkage Force (N/m) of Polarizing Plate in Absorption Axis Direction=Elastic Modulus (GPa) of Polarizing Plate in Absorption Axis Direction× |Humidity Dimensional Change Rate (%) of Polarizing Plate in Absorption Axis Direction|× Thickness (μm) of Polarizing Plate×10    Expression (A)

[2] The polarizing plate according to [1], wherein the first protective film contains a (meth)acrylic resin as a major component.

[3] The polarizing plate according to [1] or [2], wherein the creep amount of the adhesive layer is 10 μm to 90 μm.

[4] The polarizing plate according to any one of [1] to [3], wherein the thickness of the polarizing plate is 1 μm to 20 μm.

[5] The polarizing plate according to any one of [1] to [4], wherein the thickness of the second protective film is 10 μm to 35 μm.

[6] The polarizing plate according to any one of [1] to [5], wherein the thickness of the adhesive layer is 5 μm to 20 μm.

[7] The polarizing plate according to any one of [1] to [6], which is used as a polarizing plate for a viewing side of a liquid crystal display.

[8] A liquid crystal display comprising: the polarizing plate according to any one of [1] to [7] that is arranged on a viewing side of a liquid crystal cell, wherein the adhesive layer included in the polarizing plate is arranged opposite the liquid crystal cell side.

[9] The liquid crystal display according to [8], wherein the thickness of a glass substrate included in the liquid crystal cell is less than or equal to 0.5 mm.

[10] The liquid crystal display according to [8] or [9], which is an IPS mode liquid crystal display.

According to the invention, it is possible to provide a polarizing plate capable of suppressing light leakage which occurs in four corners of a liquid crystal panel due to a heat cycle where a high-temperature high-humidity environment and an ordinary-temperature ordinary-humidity environment are repeated.

DESCRIPTION OF THE PREFERRED EMBODIMENTS

Hereinafter, embodiments of the invention will be described in detail. However, the invention is not limited to these embodiments. In this specification, when physical properties, characteristics, and the like are represented by numerical values, the expression "(numerical value 1) to (numerical value 2)" refers to "greater than or equal to (numerical value 1) and less than or equal to (numerical value 2)". In addition, in this specification, the expression "(meth)acrylic resin" refers to "at least one of an acrylic resin and a methacrylic resin". The same shall be applied to "(meth)acrylate" and "(meth)acryloyl".

A polarizing plate according to the invention includes a first protective film, a polarizer, a second protective film, and an adhesive layer in this order, in which a moisture vapor permeability of the first protective film is less than or equal to 100 g/m$^2$/24 hours, the second protective film contains cellulose acylate as a major component, a creep amount of the adhesive layer is less than 100 μm, and a shrinkage force of the polarizing plate in an absorption axis direction thereof is lower than or equal to 2000 N/m.

Figure 1:
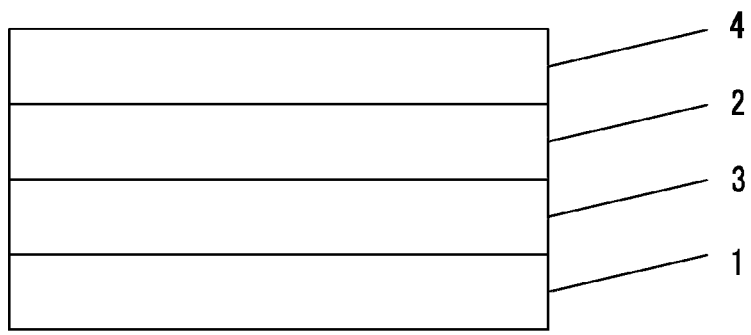
FIG. 1 is a schematic diagram illustrating an example of a polarizing plate according to the invention.

The polarizing plate according to the invention includes a first protective film, a polarizer, a second protective film, and an adhesive layer in this order. An example of the polarizing plate according to the invention is illustrated in FIG. 1. In FIG. 1, a polarizing plate 10 includes a first protective film 1, a polarizer 3, a second protective film 2, and an adhesive layer 4 in this order.

In FIG. 1, the first protective film 1, the polarizer 3, the second protective film 2, and the adhesive layer 4 are directly laminated, respectively, without another layer interposed therebetween. However, the polarizing plate according to the invention is not limited to this configuration. That is, the polarizing plate according to the invention may include another layer in addition to the first protective film, the polarizer, the second protective film, and the adhesive layer. Another layer may be provided between the first protective film and the polarizer, between the polarizer and the second protective film, or between the second protective film and the adhesive layer.

Hereinafter, the polarizer and the protective film which are included in the polarizing plate according to the invention will be described.

[Polarizer]

It is preferable that the polarizer which is used in the polarizing plate according to the invention include a polyvinyl alcohol resin (hereinafter, also referred as "PVA") and a dichroic pigment.

(1-1) Polyvinyl Alcohol Resin

As the PVA, a polymer material obtained by subjecting polyvinyl acetate to saponification is preferable, but a component which is copolymerizable with vinyl acetate may also be used, for example, unsaturated carboxylic acids, unsaturated sulfonic acids, olefins, or vinyl ethers. In addition, a modified PVA having an acetoacetyl group, a sulfone group, a carboxyl group, an oxyalkylene group, or the like may also be used.

Other examples of the PVA which is preferably used in the polarizer according to the invention include a PVA film described in JP3021494B in which the amount of a 1,2-glycol bond is less than or equal to 1.5 mol %; a PVA film described in JP2001-316492A in which the number of optical foreign materials having a size of 5 μm or greater is less than or equal to 500 per 100 cm$^2$; a PVA film described in JP2002-030163A in which a hot-water cut-through temperature variation of a film in a TD direction is less than or equal to 1.5° C.; a PVA film which is prepared from a solution in which a trivalent to hexavalent polyol such as glycerin is mixed in an amount of 1 mass % to 100 mass %; and a PVA film described in JP1994-289225A (JP-H06-289225) which is prepared from a solution in which a plasticizer is mixed in an amount of 15 mass % or greater.

Among these, as the polyvinyl alcohol resin which is used for the polarizer according to the invention, the PVA film obtained by subjecting polyvinyl acetate to saponification is preferable from the viewpoint of manufacturing cost. At this time, the saponification degree of the polyvinyl acetate is not particularly limited, but is, for example, preferably higher than or equal to 90%, more preferably higher than or equal to 95%, and particularly preferably higher than or equal to 99%.

The weight average molecular weight of the polyvinyl alcohol resin which is used for the polarizer according to the invention is not particularly limited, but is preferably 100000 to 300000, more preferably 140000 to 260000, and particularly preferably 150000 to 200000.

(1-2) Dichroic Pigment

It is preferable that the polarizer according to the invention contain a dichroic pigment. In this specification, the dichroic pigment refers to a pigment in which absorbance varies depending on directions, and includes iodine ion, cyan pigments, quinone pigments, and other well-known dichroic dyes. As the dichroic pigment, a high-order iodine ion such as $I_3^-$ or $I_5^-$ or a dichroic dye can be preferably used.

In the invention, the high-order iodine ion is particularly preferably used. The high-order iodine ion can be produced by dipping a solution obtained by dissolving iodine in an aqueous potassium iodide solution and/or an aqueous boric acid solution and adsorbing and aligning iodine on the PVA, as described in "Application of Polarizing Plates" (Ryo Nagata ed., CMC Publishing Co., Ltd., and "Industrial Material", Vol. 28, 7th edition, pp. 39 to 45).

(1-3) Thickness of Polarizer

In the invention, as a method for controlling the shrinkage force of the polarizer to be a predetermined value, a method of setting the thickness of the polarizer can be used. From the viewpoint of suppressing light leakage, the thickness of the polarizer according to the invention is preferably 1 μm to 20 μm, more preferably 3 μm to 16 μm, and most preferably 4 μm to 10 μm.

[Method of Manufacturing Polarizer]

A method of manufacturing the polarizer according to the invention which contains polyvinyl alcohol and iodine is not particularly limited. For example, after forming a film of the PVA, it is preferable that iodine be incorporated into the film to configure the polarizer. The PVA film can be manufactured referring to a method described in paragraphs [0213] to [0237] of JP2007-86748A, JP3342516B, JP1997-328593A (JP-H09-328593A), JP2001-302817A, JP2002-144401A, or the like.

In this case, it is preferable that the method of manufacturing the polarizer according to the invention include a step of forming a film using a polyvinyl alcohol resin solution which contains a polyvinyl alcohol resin; a step of stretching the polyvinyl alcohol resin film; and a step of dyeing the stretched polyvinyl alcohol resin film with a dichroic pigment.

Specifically, in the method of manufacturing the polarizer, it is particularly preferable that a preparation step of the PVA resin solution, a casting step, a swelling step, a dyeing step, a curing step, a stretching step, and a drying step be performed in this order. In addition, during or after the above-described steps, an on-line surface condition inspecting step may be provided.

(Preparation of PVA Resin solution)

In the preparation step of the PVA resin solution, it is preferable that the PVA resin be added to water under stiffing to prepare a base solution obtained by dissolving the PVA resin in water or an organic solvent. The concentration of the polyvinyl alcohol resin in the base solution is preferably 5 mass % to 20 mass %. In addition, the obtained slurry may be dehydrated to prepare a wet cake of the polyvinyl alcohol resin having a water content of approximately 40%. Next, when an additive is added, a method of putting the wet cake of the PVA into a dissolution bath, adding a plasticizer and water thereto, and stiffing them while blowing water vapor from the bottom of the bath is preferable. It is preferable that heat be applied such that the internal resin temperature is 50° C. to 150° C., and pressure may be applied to the inside of the system.

(Casting)

In the casting method, typically, a method of casting the prepared PVA resin solution into a film is preferably used. The casting method is not particularly limited, but it is preferable that the heated PVA resin solution be supplied to a twin-screw extruder to cast the PVA resin solution from a discharge means (preferably a die, more preferably a T slit die) onto a support through a gear pump to form a film. In addition, the temperature of the resin solution discharged from the die is not particularly limited.

As the support, a cast drum is preferable. The diameter, width, rotating speed, and surface temperature of the drum are not particularly limited. However, the diameter (R1) of the cast drum is preferably 2000 mm to 5000 mm, more preferably 2500 mm to 4500 mm, and particularly preferably 3000 mm to 3500 mm.

The width of the cast drum is preferably 2 m to 6 m, more preferably 3 m to 5 m, and particularly preferably 4 m to 5 m.

The rotating speed of the cast drum is preferably 2 m/min to 20 m/min, more preferably 4 m to 12 m, and particularly preferably 5 m to 10 m.

The surface temperature of the cast drum is preferably 40° C. to 140° C., more preferably 60° C. to 120° C., and particularly preferably 80° C. to 100° C.

The resin temperature at an outlet of the T-slit die is preferably 40° C. to 140° C., more preferably 60° C. to 120° C., and particularly preferably 80° C. to 100° C.

Next, it is preferable that the obtained roll be dried while allowing front and back surfaces of the roll to alternately pass through drying rolls. The diameter, width, rotating speed, and surface temperature of the drying roll are not particularly limited. Among these, the diameter (R2) of the drying roll is preferably 200 mm to 450 mm, more preferably 250 mm to 400 mm, and particularly preferably 300 mm to 350 mm In addition, the length of the obtained film is not particularly limited, and may be longer than or equal to 2000 m and preferably longer than or equal to 4000 m. The width of the film is not particularly limited, but is preferably 2 m to 6 m and more preferably 3 m to 5 m.

(Swelling)

It is preferable that the swelling be performed with only water. However, as described in JP1998-153709A (JP-H10-153709A), in order to stabilize optical performance and to avoid the generation of wrinkles of a polarizing plate substrate on the manufacturing line, the polarizing plate substrate may be swelled in an aqueous boric acid solution to control the swelling degree of the polarizing plate substrate.

In addition, the temperature and time of the swelling step are arbitrarily determined, but are preferably 10° C. to 60° C. and 5 seconds to 2000 seconds, respectively.

In the swelling step, the film may be slightly stretched, for example, preferably to 1.05 times to 1.5 times its original length and more preferably to 1.3 times its original length.

(Dyeing)

In the dyeing step, a method described in JP2002-86554A can be used. In addition, as a dyeing method, an appropriate method can be used, for example, dipping or the coating or spraying of iodine or a dyeing solution. In addition, as described in JP2002-290025A, a method of controlling the concentration of iodine, the temperature of a dyeing bath, and the stretch ratio in the bath to be within specific ranges and dyeing the film while stirring the solution in the bath may also be used.

When the high-order iodine ion is used as the dichroic pigment, in order to obtain a polarizing plate with high contrast, it is preferable that a solution obtained by dissolving iodine in an aqueous potassium iodide solution be used in the dyeing step. In this case, regarding the mass ratio of iodine and potassium iodide in the aqueous iodine-potassium iodide solution, a configuration described in JP2007-086748A can be used.

In addition, as described in JP3145747B, a boric compound such as boric acid or borax may be added to the dyeing solution.

(Curing)

In the curing step, it is preferable that the film be dipped in a crosslinking agent solution or be coated with the solution so as to contain a crosslinking agent. In addition, as described in JP1999-52130A (JPH11-52130A), the curing step may be performed through multiple processes.

As the crosslinking agent, materials described in U.S. RE232897E may be used. As described in JP3357109B, a polyvalent aldehyde may also be used as a crosslinking agent to improve dimensional stability. However, boric acids are most preferably used. When boric acid is used as the crosslinking agent in the curing step, metal ions may be added to the aqueous boric acid-potassium iodide solution. As the metal ions, zinc chloride is preferable. However, as described in JP2000-35512A, zinc halides such as zinc iodide and zinc salts such as zinc sulfate and zinc acetate may also be used instead of zinc chloride.

In addition, the PVA film may be cured by dipping the film in the aqueous boric acid-potassium iodide solution to which zinc chloride is added, or by using a method described in JP2007-086748A.

In the invention, after treating the polarizer in an environment of a temperature of 40° C. and a relative humidity of 95% for 24 hours and further treating the polarizer in an environment of a temperature of 25° C. and a relative humidity of 10% for 48 hours, as a method of controlling the shrinkage force to be the above-described value, a method of appropriately controlling curing conditions of the polarizer (for example, controlling the curing time) can be used.

(Stretching)

In the stretching step, a longitudinal uniaxial stretching method disclosed in U.S. Pat. No. 2,454,515A or a tenter method described in JP2002-86554 can be preferably used. The stretch ratio is preferably 2 times to 12 times and more preferably 3 times to 10 times. In addition, it is preferable that a relationship between the stretch ratio, the original thickness of the film, and the thickness of the polarizer satisfy "(Thickness of Polarizer After Bonding With Protective Film/Original Thickness of Film)×(Total Stretch Ratio)>0.17" as described in JP2002-040256A. As described in JP2002-040247, it is preferable that a relationship between the width of the polarizer when being pulled out from a final bath and the width of the polarizer when being bonded with the protective film satisfy "0.80≤(Width of Polarizer when Being Bonded with Protective Film/Width of Polarizer when Being Pulled Out From Final Bath)≤0.95".

In the invention, after treating the polarizer in an environment of a temperature of 40° C. and a relative humidity of 95% for 24 hours and further treating the polarizer in an environment of a temperature of 25° C. and a relative humidity of 10% for 48 hours, as a method of controlling the shrinkage force to be the above-described value, a method of appropriately controlling the stretch ratio can be used.

(Drying)

In the drying step, a well-known method described in JP2002-86554A can be used. In this case, a preferable temperature range is 30° C. to 100° C., and preferable drying time is 30 seconds to 60 minutes. In addition, as described in JP3148513B, it is preferable that a heat treatment be performed such that a underwater color-fading temperature is higher than or equal to 50° C. As described in JP1995-325215 (JPH07-325215) or JP1995-325218 (JPH07-325218), it is preferable that an aging treatment be performed in an atmosphere in which temperature and humidity are controlled.

(Coating Type Polarizer)

In addition, a polarizer having a low thickness can be manufactured using a coating method described in JP4691205B or JP4751481B.

In this step, it is preferable that a polarizer having a thickness of 1 μm to 20 μm be manufactured.

The thickness can be controlled using a well-known method. For example, the thickness can be controlled by setting the width of a die slit in the casting step or stretching conditions to be appropriate values.

[Polarizing Plate]

The polarizing plate according to the invention can contain the above-described polarizer.

<Properties of Polarizing Plate>

(Shrinkage Force in Absorption Axis Direction)

The shrinkage force of the polarizing plate in the absorption axis direction which is represented by the following expression (A) is lower than or equal to 2000 N/m.

Shrinkage Force (N/m) of Polarizing Plate in Absorption Axis Direction=Elastic Modulus (GPa) of Polarizing Plate in Absorption Axis Direction× |Humidity Dimensional Change Rate (%) of Polarizing Plate in Absorption Axis Direction|× Thickness (μm) of Polarizing Plate×10     Expression (A)

In this expression, the absorption axis direction of the polarizer refers to the direction of the absorption axis of the polarizer included in the polarizing plate.

In addition, the thickness of the polarizing plate refers to the sum of all the thicknesses of the first protective film, the second protective film, and the polarizer.

In the polarizing plate according to the invention, by controlling the shrinkage force in the absorption axis direction to be lower than or equal to 2000 N/m, the shrinkage of the polarizing plate can be suppressed, the warpage of a liquid crystal pale by the heat cycle can be suppressed, and the light leakage on the four corners can be suppressed.

In the polarizing plate according to the invention, the shrinkage force in the absorption axis direction is preferably 400 N/m to 2000 N/m, more preferably 650 N/m to 1850 N/m, and still more preferably 820 N/m to 1500 N/m.

Specifically, the shrinkage force of the polarizing plate in the absorption axis direction is measured as follows.

In order to measure the elastic modulus (GPa) of the polarizing plate according to the invention, a polarizing plate sample having a length of 200 nm in a measurement direction and a width of 10 mm on which an adhesive layer is not formed is prepared. Immediately after the sample is left to stand in an environment of a temperature of 40° C. and a relative humidity of 80% for 24 hours and is left to stand in an environment of a temperature of 25° C. and a relative humidity of 10% for 24 hours, the force is measured using STROGRAPH V10-C (manufactured by Toyo Seiki Seisaku-Sho Ltd.) at a chuck interval in the longitudinal direction of 10 cm under a load where the chuck interval is increased at a stretching speed of 10 mm/min. The elastic modulus is calculated from the thickness, force, and elongation of the polarizing plate which are measured in advance using a micrometer.

The humidity dimensional change rate (%) of the polarizing plate according to the invention can be measured as follows.

A polarizing plate sample having a length (measurement direction) of 12 cm and a width of 3 cm on which an adhesive layer is not formed is prepared. On this sample, pin holes are formed at an interval of 10 cm in an environment of a temperature of 25° C. and a relative humidity of 60%. After the sample is left to stand in an environment of a temperature of 40° C. and a relative humidity of 80% for 24 hours, the interval of the pin holes is measured using a pin gage (the measured value is set as LA1).

Next, immediately after the sample is left to stand in an environment of a temperature of 25° C. and a relative humidity of 10% for 24 hours, the interval of the pin holes is measured using a pin gage (the measured value is set as LC0). Based on these measured values, the humidity dimensional change rate is calculated from the following expression.

Humidity Dimensional Change Rate (%)={(LA1 (cm)−LC0 (cm))/10 (cm)}×100

Based on the humidity dimensional change rate (%) which is calculated from the above expression and the elastic modulus (GPa), the shrinkage force (N/m) of the polarizing plate in the absorption axis direction can be calculated according to the above-described expression (A).

The shrinkage force of the polarizing plate in the absorption axis direction can be controlled to be lower than or equal to 2000 N/m by reducing each thickness of the protective films and the polarizer and reducing the humidity dimensional changes of the protective films. Even when the elastic modulus of the protective films is reduced, the shrinkage force of the polarizing plate can be reduced. However, since an appropriate range of elastic modulus is required in the manufacturing steps of the protective films and in the manufacturing steps of the polarizer, the method of reducing the elastic modulus has low priority as the method of reducing the shrinkage force.

(Transmittance and Polarization Efficiency of Polarizing Plate)

In the polarizing plate according to the invention, in an environment of 25° C. and 60% RH, it is preferable that a single transmittance TT, a parallel transmittance PT, and a crossed transmittance CT, and a polarization efficiency P at 400 nm to 700 nm satisfy at least one of the following expressions (a) to (d) (in this case, "the transmittance at 400 nm to 700 nm" refers to the average value when a range from 400 nm to 700 nm is scanned; hereinafter, the same shall be applied).

The single transmittance refers to the transmittance of one polarizing plate, the parallel transmittance refers to the transmittance measured when two polarizing plates are arranged parallel to a transmission axis, and the crossed transmittance refers to the transmittance measured when two polarizing plates are arranged orthogonal to a transmission axis.

(a) $40.0 \leq TT \leq 45.0$
(b) $30.0 \leq PT \leq 40.0$
(c) $CT \leq 2.0$
(d) $95.0 \leq P$ The single transmittance TT, the parallel transmittance PT, and the crossed transmittance CT are more preferably $40.5 \leq TT \leq 45.0$, $32.0 \leq PT \leq 40.0$, and $CT \leq 1.5$ and still more preferably $41.0 \leq TT \leq 45.0$, $34.0 \leq PT \leq 40.0$, and $CT \leq 1.3$, respectively. The polarization efficiency is preferably higher than or equal to 95.0%, more preferably higher than or equal to 96.0, and still more preferably higher than or equal to 97.0%.

(Other Properties)

The other preferable optical properties and the like of the polarizing plate according to the invention are described in paragraphs [0238] to [0255] of JP2007-086748, and it is preferable that these properties be satisfied.

<Shape and Configuration>

Regarding the shape of the polarizing plate according to the invention, not only a polarizing plate having a film piece shape which is cut into a size so as to be incorporated into a liquid crystal display but also a polarizing plate which is prepared in a long shape by continuous production and is wound in a roll shape (for example, at a roll length of 2500 m to 3900 m) are adopted. In order to use the polarizing plate for a large-screen liquid crystal display, it is preferable that the width of the polarizing plate be greater than or equal to 1470 mm.

The polarizing plate according to the invention includes a polarizer and polarizing plate protective films that are laminated on both surfaces of the polarizer. In the polarizing plate according to the invention, it is preferable that a protector film be bonded to one surface of the polarizing plate and a separator film be bonded to the other surface thereof.

The protector film and the separator film are used for protecting the polarizing plate, for example, during the shipment of the polarizing plate or during product inspection. In this case, the protector film is bonded to a surface of the polarizing plate to protect the surface and is used for a surface of the polarizing plate which is opposite to a surface bonded to a liquid crystal substrate. In addition, the separator film covers an adhesive layer bonded to a liquid crystal substrate and is used for a surface of the polarizing plate which is bonded to a liquid crystal substrate.

Hereinafter, the details of two polarizing plate protective films which can be used in the polarizing plate according to the invention will be described.

The polarizer which is used for the polarizing plate is as described above.

First Protective Film

Hereinafter, the first protective film will be described.

(Resin)

A resin which is used for the first protective film will be described.

A well-known resin can be used as the resin which is used for the first protective film, and there is no particular limitation within a range not departing from the scope of the invention. As the resin, a thermoplastic resin is preferable, and specific examples thereof include cellulose acylate, a (meth)acrylic resin, and a cycloolefin resin. Among these, a (meth)acrylic resin which can be coated on a functional layer such as a hard coating layer or an anti-glaring layer is preferable. That is, it is preferable that the first protective film be a (meth)acrylic resin film containing a (meth)acrylic resin as a major component.

[(Meth)Acrylic Resin Film]

The above-described (meth)acrylic resin film contains a (meth)acrylic resin. The (meth)acrylic resin film is obtained, for example, by molding a molding material which contains resin components containing a (meth)acrylic resin as a major component by extrusion molding.

In the meth(acrylic) resin, the glass transition temperature (Tg) is preferably higher than or equal to 115° C., more preferably higher than or equal to 120° C., still more preferably higher than or equal to 125° C., and particularly preferably 130° C. When the meth(acrylic) resin film contains a (meth)acrylic resin with a glass transition temperature (Tg) of 115° C. or higher as a major component, the durability is superior. The upper limit of Tg of the (meth)acrylic resin is not particularly limited, but is preferably lower than or equal to 170° C. from the viewpoints of moldability and the like.

As the (meth)acrylic resin, an appropriate (meth)acrylic resin can be used. Examples of the (meth)acrylic resin include poly(meth)acrylic acid esters such as polymethylmethacrylate, methyl methacrylate-(meth)acrylic acid copolymers, methyl methacrylate-(meth)acrylic acid ester copolymers, methyl methacrylate-acrylic acid ester-(meth)acrylic acid copolymers, methyl (meth)acrylate-styrene copolymers (such as MS resin), and polymers having an alicyclic hydrocarbon group (for example, methyl methacrylate-cyclohexyl methacrylate copolymers and methyl methacrylate-norbornyl (meth)acrylate copolymers). For example, C1-6 polyalkyl (meth)acrylates such as polymethyl (meth)acrylate are preferably used. For example, methyl methacrylate resins having methyl methacrylate as a major component (50 mass % to 100 mass %, preferably, 70 mass % to 100 mass %) are more preferably used.

In the invention, from the viewpoint of obtaining high heat resistance, high transparency, and high mechanical strength, as the (meth)acrylic resin, a (meth)acrylic resin having a glutaric anhydride structure, a (meth)acrylic resin having a glutarimide structure, and a (meth)acrylic resin having a lactone ring structure are preferable, and a (meth)acrylic resin having a lactone ring structure is particularly preferable.

Examples of the (meth)acrylic resin having a glutaric anhydride structure include (meth)acrylic resins having a glutaric anhydride structure which are described in JP2006-283013A, JP2006-335902A, and JP2006-274118A.

Examples of the (meth)acrylic resin having a glutarimide structure include (meth)acrylic resins having a glutarimide structure which are described in JP2006-309033A, JP2006-317560A, JP2006-328329A, JP2006-328334A, JP2006-337491A, JP2006-337492A, JP2006-337493A, JP2006-337569A, and JP2007-009182A.

Preferable examples of the (meth)acrylic resin having a lactone ring structure include (meth)acrylic resins having a lactone ring structure, and examples of the lactone ring structure are those described in WO2006/025445, JP2007-127893A, and JP2007-316366A.

((Meth)Acrylic Polymer Having Lactone Ring Structure in Main Chain)

A (meth)acrylic polymer (hereinafter, also referred to as "lactone ring-containing polymer") having a lactone ring structure in the main chain is not particularly limited as long as it has a lactone ring in the main chain, but preferably has a lactone ring structure represented by the following formula (100).

[Chem. 1]

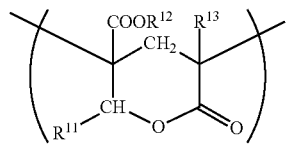

Formula (100)

In the formula (100), $R^{11}$, $R^{12}$, and $R^{13}$ each independently represent a hydrogen atom or an organic residue having 1 to 20 carbon atoms in which the organic residue may contain an oxygen atom.

In this case, as the organic residue having 1 to 20 carbon atoms, an alkyl group having 1 to 20 carbon atoms is preferable, and examples thereof include a methyl group, an ethyl group, an isopropyl group, an n-butyl group, and a t-butyl group.

The content of the lactone ring structure represented by the formula (100) in the structure of the lactone ring-containing polymer is preferably 5 mass % to 90 mass %, more preferably 10 mass % to 70 mass %, still more preferably 10 mass % to 60 mass %, and particularly preferably 10 mass % to 50 mass %. When the content of the lactone ring structure is greater than or equal to 5 mass %, the heat resistance and surface hardness of the obtained polymer tend to be improved. When the content of the lactone ring structure is less than or equal to 90 mass %, the moldability of the obtained polymer tends to be improved.

The content of the lactone ring structure can be calculated from the following expression.

Content of Lactone Ring (Mass %)=$B \times A \times M_R / M_m$ (In the expression, B represents the mass content in the monomer composition which is used for the copolymerization of a base monomer having a structure (hydroxyl group) contributing to lactone cyclization; $M_R$ represents the formula weight in the unit of the formed lactone ring structure; $M_m$ represents the molecular weight of a base monomer having a structure (hydroxyl group) contributing to lactone cyclization; and A represents the lactone cyclization ratio).

In addition, for example, when cyclization reaction is carried out along with dealcoholization reaction, the lactone cyclization ratio can be calculated from a theoretical weight reduction amount; and a heat weight reduction ratio in dealcoholization reaction during a period from 150° C. to 300° C., in which 150° C. is the temperature before the start of weight reduction, and 300° C. is the temperature before the start of decomposition of the polymer.

A method of preparing the (meth)acrylic resin having a lactone ring structure is not particularly limited. It is preferable that the (meth)acrylic resin having a lactone ring structure be obtained with a method of polymerizing the following predetermined monomers to obtain a polymer (p) having a hydroxyl group and an ester group in the molecular chains, heating the obtained polymer (p) in a temperature range from 75° C. to 120° C. to carry out lactone ring condensation in which a lactone ring structure is introduced into the polymer.

In the polymerization step, the polymer having an hydroxyl group and an ester group in the molecule chains can be obtained by polymerization reaction of monomer components which contains a monomer represented by the following formula (101).

[Chem. 2]

Formula (101)

(In the formula, $R^1$ and $R^2$ each independently represent a hydrogen atom and an organic residue having 1 to 20 carbon atoms.)

Examples of the monomer represented by the formula (101) include methyl 2-(hydroxymethyl)acrylate, ethyl 2-(hydroxymethyl)acrylate, isopropyl 2-(hydroxymethyl)acrylate, n-butyl 2-(hydroxymethyl)acrylate, and t-butyl 2-(hydroxymethyl)acrylate. Among these, methyl 2-(hydroxymethyl)acrylate and ethyl 2-(hydroxymethyl)acrylate are preferable. From the viewpoint of obtaining a high effect of improving heat resistance, methyl 2-(hydroxymethyl) acrylate is particularly preferable. As the monomer represented by the formula (101), one kind thereof may be used alone, or two or more kinds thereof may be used in combination.

Regarding the content of the monomer represented by the formula (101) in the monomer components provided in the polymerization step, the lower limit thereof is limited to a preferable range from the viewpoints of heat resistance, solvent resistance, and surface hardness, and the upper limit thereof is limited to a preferable range from the viewpoint of moldability of the obtained polymer. Based on these viewpoints, the content is preferably 5 mass % to 90 mass %, more preferably 10 mass % to 70 mass %, still more preferably 10 mass % to 60 mass %, and particularly preferably 10 mass % to 50 mass %.

The monomer components provided in the polymerization step may further contain a monomer other than the monomer represented by the formula (101). Such a monomer is not particularly limited, but preferable examples thereof include (meth)acrylic acid ester, hydroxyl group-containing monomers, unsaturated carboxylic acids, and a monomer represented by the following formula (102). As the monomer other than the monomer represented by the formula (101), one kind thereof may be used alone, or two or more kinds may be used in combination.

[Chem. 3]

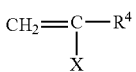

Formula (102)

(In the formula, $R^4$ represents a hydrogen atom or a methyl group; X represents a hydrogen atom, an alkyl group having 1 to 20 carbon atoms, an aryl group, a —CN group, a —CO—$R^5$ group, or a —O—C—O—$R^6$ group; and $R^5$ and $R^6$ represents a hydrogen atom or an organic residue having 1 to 20 carbon atoms.)

The weight average molecular weight of the lactone ring-containing polymer is preferably 10,000 to 2,000,000, more preferably 20,000 to 1,000,000, and particularly preferably 50,000 to 500,000.

In dynamic thermogravimetry (TG), the mass reduction ratio of the lactone ring-containing polymer in the range of 150° C. to 300° C. is preferably lower than or equal to 1%, more preferably lower than or equal to 0.5%, and still more preferably lower than or equal to 0.3%. As the dynamic TG method, a method described in JP2002-138106A can be used.

In addition, in the thermogravimetry (TG), the 5% mass reduction temperature of the lactone ring-containing polymer is preferably higher than or equal to 330° C., more preferably higher than or equal to 350° C., and still more preferably higher than or equal to 360° C. In the thermogravimetry (TG), the 5% weight reduction temperature is the index of heat stability. when the 5% mass reduction temperature is higher than or equal to 330° C., sufficient heat stability tends to be exhibited. In the thermogravimetry (TG), a measuring device of the dynamic TG can be used.

The glass transition temperature (Tg) of the lactone ring-containing polymer is preferably 115° C. to 180° C., more preferably 120° C. to 170° C., and still more preferably 125° C. to 160° C.

As the (meth)acrylic resin which is used in the invention, a commercially available product can be used. Examples of the commercially available product include DELPET 60N and 80N (manufactured by Asahi Chemicals Corporation), DIANAL BR80, BR85, BR88, and BR102 (manufactured by Mitsubishi Rayon Co. Ltd.), and KT75 (manufactured by Denki Kagaku Kogyo K.K.).

The (meth)acrylic resin film contains a (meth)acrylic resin as a major component. "Containing as a major component" refers to the content of the (meth)acrylic resin in the (meth)acrylic resin film being 50 mass % to 100%, more preferably 50 mass % to 99 mass %, still more preferably 60 mass % to 98 mass %, and particularly preferably 70 mass % to 97 mass %. It is preferable that the content of the (meth)acrylic resin in the (meth)acrylic resin film be greater than or equal 50 mass % because high heat resistance and high transparency which are properties of the (meth)acrylic resin can be sufficiently exhibited.

The content of the (meth)acrylic resin in molding materials which are used for molding the (meth)acrylic resin film is preferably 50 mass % to 100 mass %, more preferably 50 mass % to 99 mass %, still more preferably 60 mass % to 98 mass %, and particularly preferably 70 mass % to 97 mass %. When the content of the (meth)acrylic resin in the molding materials which are used for molding the (meth)acrylic resin film is less than 50 mass %, high heat resistance and high transparency which are properties of the (meth)acrylic resin may not be sufficiently exhibited.

The (meth)acrylic resin film may further contain a thermoplastic polymer other than the (meth)acrylic resin. Examples of the thermoplastic polymer other than the (meth)acrylic resin include olefin polymers such as polyethylene, polypropylene, ethylene-propylene copolymers, and poly(4-methyl-1-pentene); vinyl halide polymers such as vinyl chloride, vinylidene chloride, and vinyl chloride resins; acrylic resins such as polymethylmethacrylate; styrene polymers such as polystyrene, styrene-methyl methacrylate copolymers, styrene-acrylonitrile copolymers, and acrylonitrile-butadiene-styrene block copolymers; polyesters such as polyethylene terephthalate, polybutylene terephthalate, and polyethylene naphthalate; polyamides such as nylon 6, nylon 66, and nylon 610; polyacetals; polycarbonates; polyphenylene oxides; polyphenylene sulfides; polyether ether ketones; polysulfones; polyether sulfones; polyoxybenzylenes; polyamide-imides; and rubber-like polymers such as ABS resins and ASA resins mixed with polybutadiene type rubbers or acrylic type rubbers.

The content of the thermoplastic polymer other than the (meth)acrylic resin in the (meth)acrylic film is preferably 0 mass % to 50 mass %, more preferably 0 mass % to 40 mass %, still more preferably 0 mass % to 30 mass %, and particularly preferably 0 mass % to 20 mass %.

The (meth)acrylic resin film may contain additives. Examples of the additives include antioxidants such as hindered phenol antioxidants, phosphorus antioxidants, and sulfur antioxidants; stabilizers such as light resistant stabilizers, weatherability stabilizers, and thermal stabilizers; reinforcing materials such as glass fibers and carbon fibers; ultraviolet absorbers such as phenyl salicylate, (2,2'-hydroxy-5-methylphenyl)benzotriazole, and 2-hydroxybenzophenone; near-infrared absorbers; flame retardants such as tris(dibromopropyl)phosphate, triallyl phosphate, and antimony oxide; antistatic agents such as anionic surfactants, cationic surfactants, and nonionic surfactants; colorants such as inorganic pigments, organic pigments, and dyes; organic fillers and inorganic fillers; resin modifiers; organic filling agents and inorganic filling agents; plasticizers; lubricants; antistatic agents; flame retardants; and phase difference reducing agents.

The content of the additives in the (meth)acrylic resin film is preferably 0 mass % to 5 mass %, more preferably 0 mass % to 2 mass %, and still more preferably 0 mass % to 0.5 mass %. A method of preparing the (meth)acrylic resin film is not particularly limited. For example, a (meth)acrylic resin is sufficiently mixed with another polymer, additives, and the like using an appropriate mixing method to obtain a thermoplastic resin composition first, and a film can be formed from the thermoplastic resin composition. Alternatively, a solution of a (meth)acrylic resin and a solution of the other polymer, additives, and the like are separately prepared, these solutions are mixed with each other to obtain a uniform mixed solution, and a film may be formed from the uniform mixed solution. In order to prepare the above-described thermoplastic resin composition, the above-described film materials are pre-blended using an appropriate mixer such as an Omni-mixer, and the obtained mixture is extrusion-kneaded. In this case, the mixer which is used for extrusion kneading is not particularly limited. For example, an appropriate mixer such as a single screw extruder, a twin screw extruder, or a pressure kneader can be used.

Examples of the film forming method include appropriate film forming methods such as a solution casting method, a melt extrusion method, a calendering method, and a compression molding method. Among these film forming methods, a solution casting method and a melt extrusion method are preferable.

Examples of a solvent which is used in the solution casting method include aromatic hydrocarbons such as benzene, toluene, and xylene; aliphastic hydrocarbons such as cyclohexane and decalin; esters such as ethyl acetate and butyl acetate; ketones such as acetone, methyl ethyl ketone, and methyl isobutyl ketone; alcohols such as methanol, ethanol, isopropanol, butanol, isobutanol, methyl cellosolve, ethyl cellosolve, and butyl cellosolve; ethers such as tetrahydrofuran and dioxane; halogenated hydrocarbons such as dichloromethane, chloroform, and carbon tetrachloride; dimethyl formamides; and dimethyl sulfoxides. As the solvent, one kind may be used alone, or two or more kinds may be used in combination.

Examples a device for performing the solution casting method include a drum casting machine, a band casting machine, and a spin coater.

Examples of the melt extrusion method include a T-die method and an inflation method. The molding temperature is preferably 150° C. to 350° C. and more preferably 200° C. to 300° C.

When a film is formed using the T-die method, a T-die is attached to a tip portion of a well-known single screw extruder or twin screw extruder to wind an extruded film therearound. As a result, a roll-shaped film can be obtained. At this time, by appropriately controlling the temperature of the wound roll, the film can be uniaxially stretched in an extrusion direction. In addition, by stretching the film in a direction perpendicular to the extrusion direction, simultaneous biaxial stretching, sequential biaxial stretching, and the like can also be performed.

The (meth)acrylic resin film may be stretched or may not be stretched. When the film is stretched, the film may be uniaxially or biaxially stretched. When the film is biaxially stretched, either simultaneous biaxial stretching or sequential biaxial stretching may be performed. When the film is biaxially stretched, the mechanical strength is improved, and film performance is improved. By mixing the (meth)acrylic resin film with another thermoplastic resin, even when the film is stretched, an increase in phase difference can be suppressed, optical isotropy can be maintained.

The stretching temperature is preferably near the glass transition temperature of the thermoplastic resin composition which is the film material. Specifically, the stretching temperature is preferably (Glass Transition Temperature−30° C.) to (Glass Transition Temperature+100° C.) and more preferably (Glass Transition Temperature−20° C.) to (Glass Transition Temperature+80° C.). When the stretching temperature is lower than (Glass Transition Temperature−30° C.), the stretch ratio may be insufficient. On the other hand, when the stretching temperature is higher than (Glass Transition Temperature+100° C.), the resin composition flows, which may lead to unstable stretching.

The stretch ratio which is defined by the area ratio is preferably 1.1 times to 25 times and more preferably 1.3 times to 10 times. When the stretch ratio is less than 1.1 times, the improvement of toughness by stretching may not be obtained. When the stretch ratio is greater than 25 times, an effect corresponding to an increase in stretch ratio may not be obtained.

The stretching speed in one direction is preferably 10%/min to 20,000%/min and more preferably 100%/min to 10,000%/min. When the stretching speed is lower than 10%/min, a long period of time is required for obtaining a sufficient stretch ratio, which may lead to an increase in manufacturing cost. When the stretching speed is higher than 20,000%/min, the cracking or the like of the stretched film may occur.

In order to stabilize the optical isotropy and mechanical properties, the (meth)acrylic resin film may be subjected to a heat treatment (annealing) after the stretching treatment. As conditions of the heat treatment, appropriate conditions can be obtained.

The thickness of the (meth)acrylic resin film is preferably 5 μm to 200 μm and more preferably 10 μm to 100 μm. When the thickness is less than 5 μm, the strength deteriorates, and the film may be crimped to a large degree in a durability test of the polarizing plate. When the thickness is greater than 200 μm, the transparency deteriorates, and the moisture permeability deteriorates. As a result, when a water-based adhesive is used, the drying rate of water which is the solvent may be delayed.

The wet tension of the surface of the (meth)acrylic resin film is preferably greater than or equal to 40 mN/m, more preferably greater than or equal to 50 mN/m, and still more preferably greater than or equal to 55 mN/m. When the wet tension of the surface is at least greater than or equal to 40 mN/m, the adhesion strength of the (meth)acrylic resin film with the polarizer is further improved. In order to control the wet tension of the surface, an appropriate surface treatment may be performed. Examples of the surface treatment include a corona discharge treatment, a plasma treatment, an ozone spraying treatment, an ultraviolet irradiation treatment, a flame treatment, and a chemical treatment. Among these, a corona discharge treatment and a plasma treatment are preferable.

The cycloolefin resin which are preferably used as the first protective film is a thermoplastic resin having a unit which is derived from a monomer formed of a cyclic olefin (cycloolefin), for example, norbornene or a polycyclic norbornene monomer. This cycloolefin resin may be a ring-opened polymer of the above-described cycloolefin, a hydrogenated product of a ring-opened copolymer formed of two or more kinds of cycloolefins, or an addition copolymer of cycloolefin and chain olefin or an aromatic compound having a vinyl group. In addition, a resin into which a polar group is incorporated is also effective.

In the case of the copolymer of cycloolefin and chain olefin or an aromatic compound having a vinyl group, examples of the chain olefin include ethylene and propylene, and examples of the aromatic compound having a vinyl group include styrene, α-methylstyrene, and nuclear alkyl-substituted styrene. In such a copolymer, the amount of the unit derived from a monomer formed of cycloolefin is less than or equal to 50 mol %, for example, may be 15 mol % to 50 mol %. In particular, in the case of a terpolymer of cycloolefin, chain olefin, and an aromatic compound having a vinyl group, the amount of the unit derived from a monomer formed of cycloolefin can be reduced to be relatively small. In such a terpolymer, the amount of the unit derived from a monomer formed of chain olefin is usually about 5 mol % to 80%, and the amount of the unit derived from a monomer formed of the aromatic compound having a vinyl group is usually about 5 mol % to 80 mol %.

Examples of a commercially available product of the thermoplastic cycloolefin resin include "TOPAS" (available from Ticona GmbH in Germany); "ARTON" (available from JSR Corporation); "ZEONOR" and "ZEONEX" (available from ZEON Corporation); and "APEL" (available from Mitsui Chemicals Inc.), all of which are trade names. Such a cycloolefin resin is prepared, and a film can be formed from the cycloolefin resin. In this case, a well-known method such as a solution casting method or a melt extrusion method is appropriately used. A cycloolefin resin film is also commercially available, and examples of such a commercially available product include "ESCENA" and "SCA40" (available from Sekisui Chemical Co., Ltd.); and "ZEONOR FILM" (available from Optes Inc.), all of which are trade names.

Moisture Vapor Permeability of First Protective Film

In the polarizing plate according to the invention, the moisture vapor permeability of the first protective film is less than or equal to 100 g/m$^2$/24 hours. The moisture vapor permeability of the first protective film is preferably less than or equal to 60 g/m$^2$/24 hours, more preferably 10 g/m$^2$/24 hours to 60 g/m$^2$/24 hours, and still more preferably 10 g/m$^2$/24 hours to 30 g/m$^2$/24 hours.

In a heat cycle where environments of a liquid crystal display are repeated, for example, high humidity→low humidity→high humidity→ . . . , which is the problem to be solved by the invention, a polarizing plate for a viewing side is repeatedly expanded and shrunk by absorption and diffusion of water. The expansion or shrinkage of the polarizing plate applies a strong tension to a glass substrate on the front side of a liquid crystal panel. Therefore, the liquid crystal panel is warped, which causes light leakage (display unevenness) on for corners of the liquid crystal panel. The expansion and shrinkage of the polarizing plate can be prevented by preventing the absorption and diffusion of water on the polarizing plate on the front side. In addition, it is effective to use a protective film having a moisture permeability in the above-described range.

In order to control the moisture permeability of the first protective film to be less than or equal to 100 g/m²/24 hours, it is preferable that the protective film contain the above-described (meth)acrylic resin or cycloolefin resin as a major component, that the thickness of the first protective film be in a preferable range described below, and that the protective film contain a moisture permeability-reducing compound described below.

<Moisture Permeability-Reducing Compound>

In order to reduce permeation and desorption of water, it is preferable that the first protective film have a molecular weight of 200 or higher and contain a moisture permeability-reducing compound satisfying the following expression (1).

$$A/B \leq 0.9 \quad \text{Expression (1)}$$

(In the expression (1), A represents the moisture permeability of an optical film when the moisture permeability-reducing compound is added in an amount of 10 mass % with respect to the mass of the thermoplastic resin; B represents the moisture permeability of an optical film when the optical film contains the thermoplastic resin and the moisture permeability-reducing compound is not added; and the moisture permeability is a value in terms of a thickness of 40 μm which is measured using a method of BS Z-0208 after 24 hours in an environment of a temperature 40° C. and a relative humidity of 90%.)

In the moisture permeability-reducing compound, A/B is more preferably lower than or equal to 0.8 and still more preferably lower than or equal to 0.7. When the thermoplastic resin of the first protective film is a (meth)acrylic resin or a norbornene resin, A/B is still more preferably lower than or equal to 0.60. When the thermoplastic resin of the first protective film is a norbornene resin, A/B is yet still more preferably lower than or equal to 0.5.

The above-described moisture permeability-reducing compound may have a structure having one or more aromatic rings. The aromatic rings can impart hydrophobic properties to the film and can suppress permeation and desorption of water.

It is more preferable that the above-described moisture permeability-reducing compound have a structure having three or more aromatic rings.

In addition, it is preferable that the moisture permeability-reducing compound contain one or more —OH groups, and it is more preferable that the moisture permeability-reducing compound contain three or more aromatic rings and one or more —OH groups.

As the moisture permeability-reducing compound, a compound represented by the following formula (B), a phenol resin, a terpene resin, an aromatic hydrocarbon formaldehyde resin, a barbituric acid, or a phosphoric acid ester is preferable; a compound represented by the following formula (B), a phenol resin, a terpene resin, an aromatic hydrocarbon formaldehyde resin, or a barbituric acid is more preferable; and a novolac type phenol resin, a hydrogenated terpene resin, a xylene resin, or a barbituric acid is particularly preferable.

From the viewpoints of reducing the moisture permeability of the first protective film and improving black display unevenness when a liquid crystal display into which the first protective film is incorporated is left to stand in a high-temperature high-humidity environment for a certain period of time, a phenol resin or the above-described terpene resin or aromatic hydrocarbon formaldehyde resin is preferable; and a phenol resin (preferably, a novolac type phenol resin) or an aromatic hydrocarbon formaldehyde resin (preferably, a xylene resin) is more preferable.

Moreover, among the above-described moisture permeability-reducing compounds, a compound having a structure containing one or more aromatic rings is preferable, and a compound having a structure containing three or more aromatic rings is more preferable.

As the moisture permeability-reducing compound, a compound represented by the following formula (C) is more preferable.

[Chem. 4]

Formula (C)

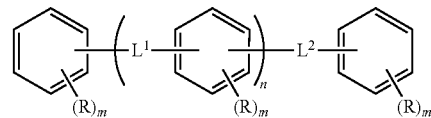

(In the formula (C), n represents an integer from 1 to 10; each m independently represents an integer from 1 to 4; each R independently represents a hydrogen atom or an alkyl group having 1 to 10 carbon atoms which optionally has —OH group or a substituent; $L^1$ and $L^2$ each independently represent a methylene group or —CH$_2$—O—CH$_2$—; and at least one R represents —OH group.)

In the formula (C), it is preferable that n represent an integer from 1 to 7.

In the formula (C), it is preferable that m represent an integer from 1 to 3, and it is more preferable that m represent 1 or 2.

In the formula (C), it is preferable that each R independently represent a hydrogen atom, or a methyl group or an ethyl group which optionally has an —OH group or a substituent. In the formula (C), the substituent which is optionally included in the alkyl group represented by R is not particularly limited, but is preferably an —OH group.

In the formula (C), it is preferable that at least one R represent a group having an —OH group and a benzene ring at a molecular terminal has at least one —OH group.

As the moisture permeability-reducing compound represented by the formula (C), a compound satisfying the formula (C) among phenol resins and aromatic hydrocarbon aldehyde resins which are described below is preferable.

As the moisture permeability-reducing compound, petrolium resins, terpene resins, terpene phenol resins, rosin resins, cumarone resins, resins having formaldehyde as a base material (for example, phenol resins such as phenol formaldehyde resins and derivatives thereof, and aromatic hydrocarbon formaldehyde resins or derivatives thereof), and hydrides thereof are preferably used.

(Phenol Resin)

As the phenol resin which is used in the invention, a novolac type phenol resin is preferable.

The novolac type phenol resin which is used in the invention which is used in the invention is a normal novolac type phenol resin obtained by allowing phenol and formaldehyde (formalin) to react with each other in the presence of an acidic catalyst such as oxalic acid. A material of the phenol is not particularly limited, and for example, phenol, o-cresol, m-cresol, p-cresol, p-tert-butylphenol, p-tert-octylphenol, p-octylphenol, and p-nonylphenol, and mixtures thereof can be used. As the material of the phenol, p-cresol is preferable.

In addition, as a material of formaldehyde, for example, formalin, paraformaldehyde, and acetal and mixtures thereof can be used.

A structure of the novolac type phenol resin is represented by the following formula (1).

[Chem. 5]

Formula (1)

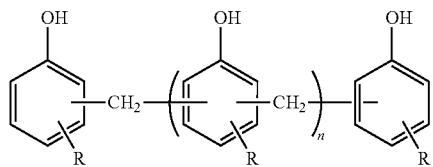

(In the formula (1), n represents an integer from 1 to 10 on average, each R independently represents a hydrogen atom or an alkyl group having 1 to 10 carbon atoms.

In the formula (1), R represents a hydrogen atom or an alkyl group having 1 to 10 carbon atoms. From the viewpoints of durability, an alkyl group having 1 to 10 carbon atoms is preferable, and a methyl group is more preferable.

In the formula (1), a position of R which is substituted with each benzene ring is not particularly limited, but is preferably a para position to an —OH group.

In the formula (1), it is preferable that n represent an integer from 1 to 7.

In the formula (1), a binding position of a methylene group bonded to each benzene ring is not particularly limited, but is preferably an ortho position to an —OH group.

Specific examples of the novolac type phenol resin represented by the formula (1) are shown below, but the invention is not limited thereto. In addition, in the following specific examples, n has the same definition as that in the formula (1). Among the following specific examples, A-4 is preferable.

[Chem. 6]

A-1

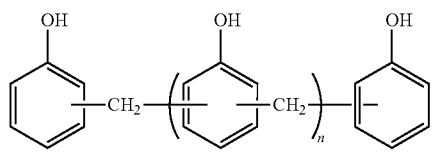

A-2

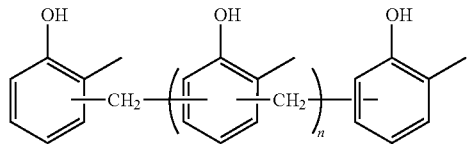

A-3

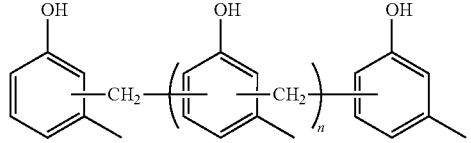

-continued

A-4

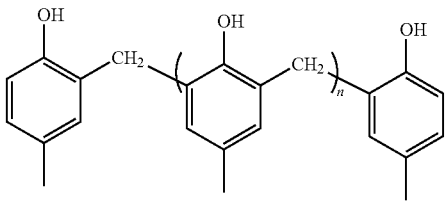

A-5

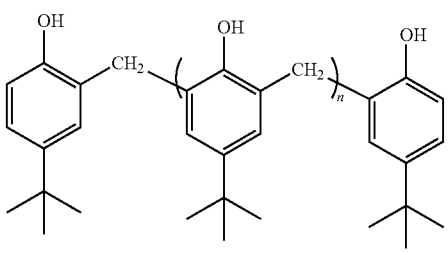

A-6

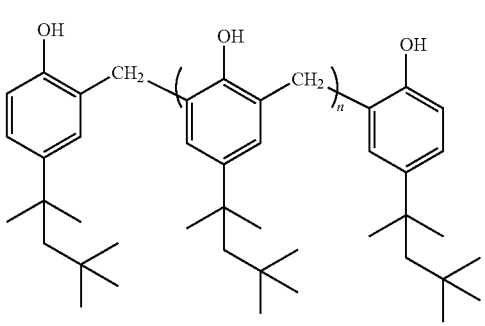

A-7

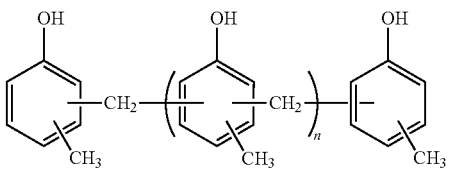

As the novolac type phenol resin, a phenol resin manufactured by Sumitomo Bakelite Co., Ltd. (for example, SUMILITE RESIN PR-HF-3) can be preferably used.

In the novolac type phenol resin, the weight average molecular weight is preferably 200 to 10000, more preferably 200 to 5000, and still more preferably 200 to 3000.

(Aromatic Hydrocarbon Formaldehyde Resin)

As the aromatic hydrocarbon formaldehyde resin which is used in the invention, a normal aromatic hydrocarbon aldehyde resin which can allow an aromatic hydrocarbon and formaldehyde (formalin) to react with each other can be used. A material of the aromatic hydrocarbon is not particularly limited, and for example, three isomers of toluene and xylene, mesitylene, and monocyclic aromatic hydrocarbon compounds having 10 or more carbon atoms, and mixtures thereof can be used. Among the above-described aromatic hydrocarbons, xylene is preferable, and m-xylene is more preferable.

In addition, as a material of formaldehyde, formalin, paraformaldehyde, and acetal and mixtures thereof can be used.

It is preferable that a structure of the aromatic hydrocarbon formaldehyde resin be represented by the following formula (2).

[Chem. 7]

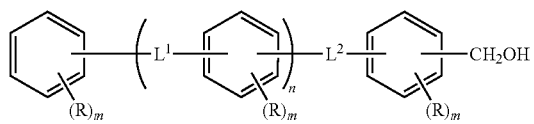

Formula (2)

(In the formula (2), n represents an integer from 1 to 10 on average; each m independently represents an integer from 1 to 3; each R independently represents a methyl group or an ethyl group; and $L^1$ and $L^2$ each independently represent a methylene group or —CH$_2$—O—CH$_2$.

In the formula (2), it is preferable that R represents a methyl group.

In the formula (2), the number of R which is substituted with each benzene ring is not particularly limited, but is preferably 0 to 2 and more preferably 2.

In the formula (2), a position of R which is substituted with each benzene ring is not particularly limited.

In the formula (2), it is preferable that n represent an integer from 1 to 7.

In the formula (2), a binding position of a methylene group or a —CH$_2$O— group bonded to each benzene ring is not particularly limited, but is preferably a meta position to each other.

Specific examples of the aromatic hydrocarbon formaldehyde resin represented by the formula (2) are shown below, but the invention is not limited thereto. In addition, n has the same definition as that in the formula (2).

In the aromatic hydrocarbon formaldehyde resin, the molecular weight is preferably 200 to 10000, more preferably 200 to 5000, and still more preferably 200 to 3000.

The aromatic hydrocarbon formaldehyde resin can be preferably used when the thermoplastic resin of the first protective film is a norbornene resin.

(Terpene Resin)

It is preferable that the terpene resin which is used in the invention be a hydrogenated terpene resin.

The hydrogenated terpene resin which is used in the invention is a compound obtained by partially hydrogenating a terpene resin which is usually obtained by cationic polymerization of a terpene compound in the presence of a Friedel-Crafts catalyst. Preferable examples of the terpene compound include α-pinene, β-pinene, dipentene, d-limonene, myrcene, allo-ocimene, ocimene, α-phellandrene, α-terpinene, γ-terpinene, terpinolene, 1,8-cineole, 1,4-cineole, α-terpineol, β-terpineol, γ-terpineol, sabinene, paramenthadienes, and careens. Among these, α-pinene, β-pinene, dipentene, and d-limonene are preferably used. In addition, as a material of the terpene resin, in addition to the terpene compound, a combination of a terpene compound and an aromatic compound or a combination of a terpene compound and a phenol compound may be used.

Preferable examples of the hydrogenated terpene resin include hydrogenated terpene resins (CLEARON P150, CLEARON P135, CLEARON P125, CLEARON P115, CLEARON P105, and CLEARON P85) and aromatic modified hydrogenated terpene resins (CLEARON M125, CLEARON M115, and CLEARON M105), which are manufactured by Yasuhara Chemical Co., Ltd.

[Chem. 8]

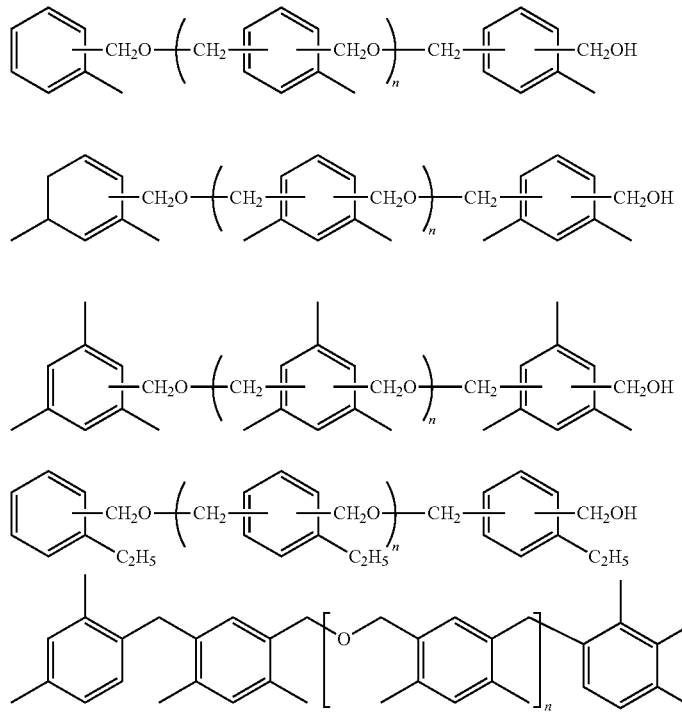

As the aromatic hydrocarbon formaldehyde resin, a xylene resin manufactured by Fudow Co., Ltd. (for example, NIKANOL Y1000) can be preferably used.

As the moisture permeability-reducing compound included in the first protective film, a compound represented by the following formula (B) can be preferably used.

Formula (B)

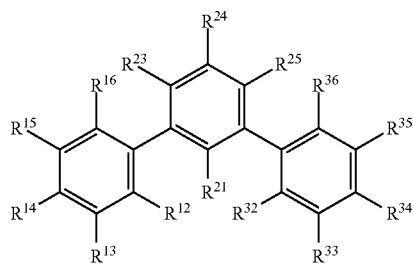

In the formula (B), $R^{12}$, $R^{13}$, $R^{14}$, $R^{15}$, $R^{16}$, $R^{21}$, $R^{23}$, $R^{24}$, $R^{25}$, $R^{32}$, $R^{33}$, $R^{34}$, $R^{35}$, and $R^{36}$ each independently represent a hydrogen atom or a substituent; and as the substituent, a substituent T described below can be used. Moreover, in the formula (B), at least one of $R^{12}$, $R^{13}$, $R^{14}$, $R^{15}$, $R^{16}$, $R^{21}$, $R^{23}$, $R^{24}$, $R^{25}$, $R^{32}$, $R^{33}$, $R^{34}$, $R^{35}$, and $R^{36}$ represents an amino group, an acylamino group, an alkoxycarbonylamino group, an aryloxycarbonylamino group, a sulfonylamino group, a hydroxy group, a mercapto group, and a carboxyl group.

Examples of the substituent T include an alkyl group (which have preferably 1 to 20 carbon atoms, 1 to 12 carbon atoms, and particularly preferably 1 to 8 atoms, and examples thereof include a methyl group, an ethyl group, an isopropyl group, a tert-butyl group, an n-octyl group, an n-decyl group, an n-hexadecyl group, a cyclopropyl group, a cyclopentyl group, and a cyclohexyl group), an alkenyl group (which have preferably 2 to 20 carbon atoms, more preferably 2 to 12 carbon atoms, and particularly preferably 2 to 8 carbon atoms, and examples thereof include a vinyl group, an allyl group, a 2-butenyl group, and a 3-pentenyl group), an alkynyl group (which have preferably 2 to 20 carbon atoms, more preferably 2 to 12 carbon atoms, and particularly preferably 2 to 8 carbon atoms, and examples thereof include a propargyl group and a 3-pentynyl group), an aryl group (which have preferably 6 to 30 carbon atoms, more preferably 6 to 20 carbon atoms, and particularly preferably 6 to 12 carbon atoms, and examples thereof include a phenyl group, a p-methylphenyl group, and a naphthyl group), an amino group (which have preferably 0 to 20 carbon atoms, more preferably 0 to 10 carbon atoms, and particularly preferably 0 to 6 carbon atoms, and examples thereof include an amino group, a methylamino group, a dimethylamino group, a diethylamino group, and a dibenzylamino group), an alkoxy group (which have preferably 1 to 20 carbon atoms, more preferably 1 to 12 carbon atoms, and particularly preferably 1 to 8 carbon atoms, and examples thereof include a methoxy group, an ethoxy group, and a butoxy group), an aryloxy group (which have preferably 6 to 20 carbon atoms, more preferably 6 to 16 carbon atoms, and particularly preferably 6 to 12 carbon atoms, and examples thereof include a phenyloxy group and a 2-naphthyloxy group), an acyl group (which have preferably 1 to 20 carbon atoms, more preferably 1 to 16 carbon atoms, and particularly preferably 1 to 12 carbon atoms, and examples thereof include an acetyl group, a benzoyl group, a formyl group, and a pivaloyl group), an alkoxycarbonyl group (which have preferably 2 to 20 carbon atoms, more preferably 2 to 16 carbon atoms, and particularly preferably 2 to 12 carbon atoms, and examples thereof include a methoxycarbonyl group and an ethoxycarbonyl group), an aryloxycarbonyl group (which have preferably 7 to 20 carbon atoms, more preferably 7 to 16 carbon atoms, and particularly preferably 7 to 10 carbon atoms, and examples thereof include a phenyloxycabonyl group), an acyloxyl group (which have preferably 2 to 20 carbon atoms, more preferably 2 to 16 carbon atoms, and particularly preferably 2 to 10 carbon atoms, and examples thereof include an acetoxy group and a benzoyloxy group), an acylamino group (which have preferably 2 to 20 carbon atoms, more preferably 2 to 16 carbon atoms, and particularly preferably 2 to 10 carbon atoms, and examples thereof include an acetylamino group and a benzoylamino group), an alkoxycarbonylamino group (which have preferably 2 to 20 carbon atoms, more preferably 2 to 16 carbon atoms, and particularly preferably 2 to 12 carbon atoms, and examples thereof include a methoxycarbonylamino group), an aryloxycarbonylamino group (which have preferably 7 to 20 carbon atoms, more preferably 7 to 16 carbon atoms, and particularly preferably 7 to 12 carbon atoms, and examples thereof include a phenyloxycarbonylamino group), a sulfonylamino group (which have preferably 1 to 20 carbon atoms, more preferably 1 to 16 carbon atoms, and particularly preferably 1 to 12 carbon atoms, and examples thereof include a methanesulfonylamino group and a benzenesulfonylamino group), a sulfamoyl group (which have preferably 0 to 20 carbon atoms, more preferably 0 to 16 carbon atoms, and particularly preferably 0 to 12 carbon atoms, and examples thereof include a sulfamoyl group, a methylsulfamoyl group, a dimethylsulfamoyl group, and a phenylsulfamoyl group), a carbamoyl group (which have preferably 1 to 20 carbon atoms, more preferably 1 to 16 carbon atoms, and particularly preferably 1 to 12 carbon atoms, and examples thereof include a carbamoyl group, a methylcarbamoyl group, a diethylcarbamoyl group, and a phenylcarbamoyl group), an alkylthio group (which have preferably 1 to 20 carbon atoms, more preferably 1 to 16 carbon atoms, and particularly preferably 1 to 12 carbon atoms, and examples thereof include a methylthio group and an ethylthio group), an arylthio group (which have preferably 6 to 20 carbon atoms, more preferably 6 to 16 carbon atoms, and particularly preferably 6 to 12 carbon atoms, and examples thereof include a phenylthio group), a sulfonyl group (which have preferably 1 to 20 carbon atoms, more preferably 1 to 16 carbon atoms, and particularly preferably 1 to 12 carbon atoms, and examples thereof include a mesyl group and a tosyl group), a sulfinyl group (which have preferably 1 to 20 carbon atoms, more preferably 1 to 16 carbon atoms, and particularly preferably 1 to 12 carbon atoms, and examples thereof include a methanesulfinyl group and a benzenesulfinyl group), a ureido group (which have preferably 1 to 20 carbon atoms, more preferably 1 to 16 carbon atoms, and particularly preferably 1 to 12 carbon atoms, and examples thereof include a ureide group, a methylureide group, and a phenylureide group), a phosphoric amide group (which have preferably 1 to 20 carbon atoms, more preferably 1 to 16 carbon atoms, and particularly preferably 1 to 12 carbon atoms, and examples thereof include a diethylphosphoric amide group and a phenylphosphoric amide group), a hydroxy group, a mercapto group, a halogen atom (for example, a fluorine atom, a chlorine atom, a bromine atom, or an iodine atom), a cyano group, a sulfo group, a carboxyl group, a nitro group, a hydroxamic acid group, a sulfino group, a hydrazino group, an imino group, a heterocyclic group (which have preferably 1 to 30 carbon atoms and more preferably 1 to 12 carbon atoms and has a nitrogen atom, an oxygen atom, or a sulfur atom as a hetero atom, and specific examples thereof include an imidazolyl group, a pyridyl group, a quinolyl group, a furyl group, a piperidyl group, a morpholino group, a benzoxazolyl group, a benzimidazolyl group, and a benzthiazolyl group), and a silyl groups (which have preferably 3 to 40 carbon atoms, more preferably 3 to 30 carbon atoms, and particularly preferably 3 to 24 carbon atoms, and examples thereof include a trimethylsilyl group and a triphenylsilyl group). Among these, an alkyl group, an aryl group, a substituted or unsubstituted amino group, an alkoxy group, or an aryloxy group is more preferable, and an alkyl group, an aryl group, or an alkoxy group is still more preferable.

These substituents may be further substituted with the substituent T. In addition, when there are two or more substituents, these substituents may be the same as or different from each other. In addition, if possible, these substituents may be bonded to each other to form a ring.

In addition, in the formula (B), at least one of $R^{12}$, $R^{13}$, $R^{14}$, $R^{15}$, $R^{16}$, $R^{21}$, $R^{23}$, $R^{24}$, $R^{25}$, $R^{32}$, $R^{33}$, $R^{34}$, $R^{35}$, and $R^{36}$ represents an amino group, an acylamino group, an alkoxycarbonylamino group, an aryloxycarbonylamino group, a sulfonylamino group, a hydroxy group, a mercapto group, and a carboxyl group; more preferably represents an amino group, and a hydroxy group; and particularly preferably represents a hydroxy group. In addition, these groups are optionally substituted with a substituent. In this case, as the substituent, the above-described substituents T can be used, and preferable ranges are also the same.

Preferable examples of the compound represented by the formula (B) according to the invention are shown below, but the invention is not limited to these specific examples.

[Chem. 10]

B-1

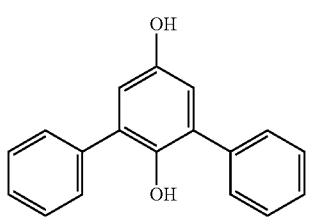

B-2

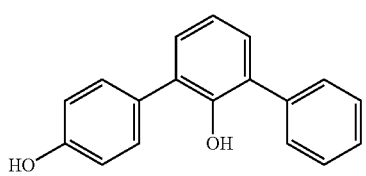

B-3

B-4

B-5

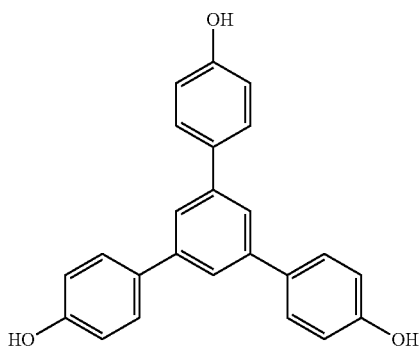

B-6

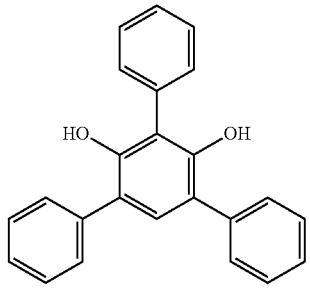

[Chem. 11]

B-7

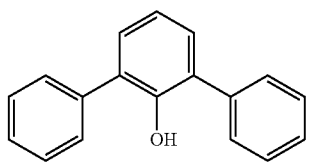

The content of the above-described moisture permeability-reducing compound in the first protective film is preferably 10 mass % to 100 mass %, more preferably 15 mass % to 90 mass %, and still more preferably 20 mass % to 80 mass % with respect to the mass of the thermoplastic resin.

(Thickness of First Protective Film)

In the polarizing plate according to the invention, the thickness of the first protective film is preferably 15 µm to 60 µm, more preferably 20 µm to 50 µm, and still more preferably 25 µm to 45 µm from the viewpoint of moisture permeability. The thickness of the first protective film can be measured using a commercially available thickness meter.

<Second Protective Film>

Hereinafter, the second protective film will be described.

(Cellulose Acylate)

In the polarizing plate according to the invention, the second protective film is a cellulose acylate film containing cellulose acylate as a major component. "Containing as a major component" refers to the content of cellulose acylate in the cellulose acylate film being 50 mass % to 100%, more preferably 50 mass % to 99 mass %, still more preferably 60 mass % to 98 mass %, and particularly preferably 70 mass % to 97 mass %. When the content of cellulose acylate in the cellulose acylate film is greater than or equal to 50 mass %, the film has moisture permeability, which is preferable from the viewpoint of the manufacturing efficiency of the polarizing plate.

During the manufacture of the polarizing plate according to the invention, when a commonly-used water-based adhesive is used between the first protective film and the polarizer and between the polarizer and the second protective film, the drying time is likely to be increased due to low moisture permeability of the first protective film. Therefore, when the second protective film is a film containing cellulose acylate as a major component, the drying time can be controlled to be in a more preferable range due to the moisture permeability of the film, which can increase the manufacturing efficiency of the polarizing plate according to the invention.

Hereinafter, the cellulose acylate which can be used in the invention will be described in detail.

The substitution degree of cellulose acylate represents a degree where three hydroxyl groups which is present in a constitutional unit ((β)1,4-glucoside-bonded glucose) of cellulose are acylated. The substitution degree (acylation degree) can be calculated by measuring the amount of a fatty acid bonded per the mass of a constitutional unit of cellulose. In the invention, the substitution degree of a cellulose compound can be calculated from a peak intensity ratio of carbonyl carbon in an acyl group which is obtained by dissolving the cellulose compound in a deuterium-substituted solvent such as dimethyl sulfoxide and measuring the $^{13}$C-NMR spectrum thereof. The substitution degree can be obtained by the $^{13}$C-NMR measurement after substituting the residual hydroxyl group of cellulose acylate with another acyl group different from the acyl group in the cellulose acylate. The details of the measurement method are described in Carbohydrate. Res. (by Tezuka et. al., 273 (1995), 83-91).

The total acylation degree of cellulose acylate which can be used in the invention is preferably 2.0 to 2.97, more preferably 2.2 to 2.95, and particularly preferably 2.3 to 2.95. In particular, when the organic acid used in the invention is used in combination with cellulose acylate having such a total acylation degree, an effect of improving the durability of the polarizing plate is high.

As the acyl group of the cellulose acylate which can be used in the invention, an acetyl group, a propionyl group, or a butyryl group is preferable, and an acetyl group is more preferable.

A mixed fatty acid ester having two or more kinds of acyl groups can also be preferably used as the cellulose acylate according to the invention. In this case, as the acyl groups, an acetyl group and an acyl group having 3 to 4 carbon atoms are preferable. In addition, when the mixed fatty acid ester is used, the substitution degree of the acetyl group is preferably less than 2.5 and more preferably less than 1.9. On the other hand, the substitution degree of the acyl group having 3 to 4 carbon atoms is preferably 0.1 to 1.5, more preferably 0.2 to 1.2, and particularly preferably 0.5 to 1.1.

In the invention, two kinds of cellulose acylates having different substitution degrees and/or different substituents may be used in combination or as a mixture. Alternatively, using a co-casting method described below, a film including multiple layers which are formed of different cellulose acylates may be formed.

Moreover, a mixed acid ester having a fatty acid acyl group and a substituted or unsubstituted aromatic acyl group which is described in paragraphs [0023] to [0038] of JP2008-20896A can also be preferably used in the invention.

The cellulose acylate which is used in the invention has a mass average polymerization degree of preferably 250 to 800 and more preferably 300 to 600. In addition, the cellulose acylate which is used in the invention has a number average molecular weight of preferably 70000 to 230000, more preferably 75000 to 230000, and most preferably 78000 to 120000.

The cellulose acylate which is used in the invention can be synthesized by using an acid anhydride or an acid chloride as an acrylating agent. When the acrylating agent is an acid anhydride, an organic acid (for example, acetic acid) or methylene chloride is used as a reaction solvent. In addition, as a catalyst, a protic catalyst such as sulfuric acid can be used. When the acrylating agent is an acid anhydride, a basic compound can be used as a catalyst. In a synthesis method most typically used in the industry, an cellulose ester is synthesized by esterification of cellulose with a mixed organic component containing an acetyl group and an organic acid (acetic acid, propionic acid, butyric acid) corresponding to another acyl group, or an anhydride thereof (acetic anhydride, propionic anhydride, butyric anhydride).

In this method, is in many cases, cellulose such as cotton linter or wood pulp is subjected to an activation treatment with an organic acid such as acetic acid and then is subjected to esterification using a mixed solution of the above-described organic acid components in the presence of a sulfuric acid catalyst. The organic acid anhydride components are typically used in an excess amount with respect to the amount of a hydroxyl group present in cellulose. In the esterification treatment, hydrolysis reaction (depolymerization reaction) of the cellulose main chain (β-1,4-glycoside bond) advances along with the esterification reaction. When the hydrolysis reaction of the main chain advances, the polymerization degree of the cellulose ester decreases, and the properties of the manufactured cellulose ester film deteriorate. Therefore, it is preferable that reaction conditions such as the reaction temperature be determined in consideration of the polymerization degree and molecular weight of the obtained cellulose ester.

(Thickness of Second Protective Film)

In the polarizing plate according to the invention, the thickness of the second protective film is preferably 10 μm to 35 μm, more preferably 10 μm to 30 μm, and still more preferably 15 μm to 25 μm from the viewpoints of reducing the moisture permeability, which is required during the manufacturing process of the polarizing plate, and the shrinkage force of the polarizing plate. The thickness of the second protective film can be measured using a commercially available thickness meter.

(Additives)

The first and second protective films may contain an organic acid or well-known additives which are used in other polarizing plate protective films within a range not departing from the scope of the invention.

<Method of Manufacturing Polarizing Plate Protective Film>

The first and second polarizing plate protective films can be manufactured using a solvent casting method. Hereinafter, a method of manufacturing a polarizing plate protective film will be described referring to an example in which cellulose acylate is used as a substrate. However, the polarizing plate protective film can also be manufactured using the other resins. In the solvent casting method, a film is formed using a solution (dope) obtained by dissolving cellulose acylate in an organic solvent.

It is preferable that the organic solvent containing a solvent selected from ethers having 3 to 12 carbon atoms, ketones having 3 to 12 carbon atoms, esters having 3 to 12 carbon atoms, and halogenated hydrocarbons having 1 to 6 carbon atoms.

The ethers, ketones, and esters may have a ring structure. In addition, compounds having two or more functional groups (that is, —O—, —CO—, and —COO—) of the ethers, ketones, and esters can also be used as the organic solvent. The organic solvent may further other functional groups such as an alcoholic hydroxyl group. When the organic solvent has two or more functional groups, the number of carbon atoms thereof is preferably in the above-described preferable range of the number of carbon atoms of a solvent having any of the functional groups.

Examples of the ethers having 3 to 12 carbon atoms include diisopropyl ether, dimethoxymethane, dimethoxyethane, 1,4-dioxane, 1,3-dioxolane, tetrahydrofuran, anisole, and phenetole.

Examples of the ketones having 3 to 12 carbon atoms include acetone, methyl ethyl ketone, diethyl ketone, diisobutyl ketone, cyclohexanone, and methylcyclohexanone.

Examples of the esters having 3 to 12 carbon atoms include ethyl formate, propyl formate, pentyl formate, methyl acetate, ethyl acetate, and pentyl acetate.

Examples of the organic solvent having two or more functional groups include 2-ethoxyethyl acetate, 2-methoxyethanol, and 2-butoxyethanol.

The number of carbon atoms included in the halogenated hydrocarbons having 1 to 6 carbon atoms is preferably 1 or 2 and most preferably 1. It is preferable that halogen of the halogenated hydrocarbons be chlorine. The ratio of hydrogen atoms which are substituted with halogen in the halogenated hydrocarbons is preferably 25 mol % to 75%, more preferably 30 mol % to 70 mol %, still more preferably 35% to 65%, and most preferably 40 mol % to 60%. Methylene chloride is a representative example of the halogenated hydrocarbon.

A mixture of two or more kinds of organic solvents may be used.

The cellulose acylate solution (dope) can be prepared with an ordinary method of performing a treatment at a temperature of 0° C. or higher (ordinary temperature or a higher temperature). The cellulose acylate solution can be prepared using a method and a device for preparing the dope which are used in an ordinary solvent casting method. In the ordinary method, it is preferable that a halogenated hydrocarbon (particularly, methyl chloride) be used as an organic solvent.

The amount of cellulose acylate in the cellulose acylate solution is controlled to be 10 mass % to 40 mass % in the obtained solution. The amount of cellulose acylate is more preferably 10 mass % to 30 mass %. Optional additives described below may be added to the organic solvent (main solvent).

The cellulose acylate solution can be prepared by stirring cellulose acylate and the organic solvent at normal temperature (0° C. to 40° C.). A high concentration of solution may be stirred under pressurizing and heating conditions. Specifically, cellulose acylate and the organic solvent are put into a pressurized vessel, and the pressurized vessel is sealed, followed by stirring while heating the pressurized vessel under increased pressure to a temperature which is higher than or equal to the boiling point of the solvent at normal temperature and falls within a range where the solvent does not boil. The heating temperature is usually higher than or equal to 40° C., preferably 60° C. to 200° C., and more preferably 80° C. to 110° C.

The respective components may be put into a vessel after being preliminarily mixed. Alternatively, each component may be put into the vessel in order. It is necessary that the chamber be designed such that the contents can be stirred therein. An inert gas such as nitrogen gas can be introduced into the vessel to apply pressure thereto. In addition, the increase in the vapor pressure of the solvent by heating may be used. Alternatively, after sealing the vessel, the respective components may be added thereto under pressure.

When the vessel is heated, it is preferable that the vessel be heated from the outside of the vessel. For example, a jacket type heating device can be used. In addition, the entire vessel can be heated by providing a plate heater outside the vessel to circulate liquid through a pipe.

It is preferable that stirring be performed by providing a stirring blade inside the vessel and using it. It is preferable that the stirring blade have a length that reaches near a wall of the vessel. It is preferable that a scarping blade be provided at an end of the stirring blade for renewing the liquid film on the surface of the vessel.

The vessel may be provided with indicators such as a manometer or a thermometer. In the vessel, the respective components are dissolved in a solvent. The prepared dope is taken out from the vessel after being cooled or is cooled using an heat exchanger or the like after being taken out.

The cellulose acrylate solution can be prepared using a cooling dissolution method. The details of the cooling dissolution method can refer to techniques described in paragraphs [0115] to [0122] of JP2007-86748A.

A cellulose acrylate film can be manufactured from the prepared cellulose acrylate solution (dope) using a solvent casting method. It is preferable that a retardation-increasing agent be added to the dope. The dope is cast onto a drum or a band, and a solvent is removed by distillation to form a film. It is preferable that the concentration of the dope before casting be controlled to be 18% to 35% in terms of solid content. It is preferable that a surface of the drum or the band be mirror-finished. It is preferable that the dope be cast on the drum or the band having a surface temperature of 10° C. or lower.

A drying method in the solvent casting method is described in U.S. Pat. Nos. 2,336,310A, 2,367,603A, 2,492,078A, 2,492,977A, 2,492,978A, 2,607,704A, 2,739,069A, 2,739,070A, British Patent Nos. 640731 and 736892, JP1971-4554B (JP-S45-4554B), JP1974-5614 (JP-S49-5614), JP1985-176834 (JP-S60-176834), JP1985-203430 (JP-S60-203430), and JP1987-115035 (JP-S62-115035). The film can be dried on the band or the drum by blowing air or an inert gas such as nitrogen gas thereto.

In addition, the obtained film is peeled off from the drum or the band and can be dried with warm air while sequentially changing the temperature from 100° C. to 160° C. to remove the residual solvent by distillation. The above-described method is described in JP1993-17844B (JP-H05-17844B). According to this method, a period of time from casting to peeling can be shortened. In order to perform this method, it is necessary that the dope be gelled at the surface temperature of the drum or the band during casting.

The cellulose acrylate film can be formed by casting the prepared cellulose acrylate solution (dope) to form two or more layers. In this case, it is preferable that the cellulose acrylate film be prepared using a solvent casting method. The dope is cast onto a drum or a band, and a solvent is removed by distillation to form a film. It is preferable that the concentration of the dope before casting be controlled to be 10% to 40% in terms of solid content. It is preferable that a surface of the drum or the band be mirror-finished.

When the cellulose acrylate solution is cast to form two or more layers, plural cellulose acrylate solutions can be cast. The film may be prepared by casting solutions containing cellulose acrylate from plural casting mouths which are provided at intervals in a moving direction of a support and laminating the solutions. This process can be performed, for example, using a method described in JP1986-158414B (JP-S61-158414B), JP1989-122419 (JP-H01-122419), and JP1999-198285B (JP-H11-198285B). In addition, the film can be formed by casting cellulose acrylate solutions from two casting mouths. This process can be formed, for example, using a method described in JP1965-27562B (JP-S60-

27562B), JP1966-94724A (JP-S61-94724A), JP1965-947245A (JP-S61-947245A), JP1965-104813A (JP-S61-104813A), JP1965-158413A (JPS61-158413A), and JP1994-134933A (JP-H06-134933). Moreover, a casting method of a cellulose acrylate film disclosed in JP1981-162617A (JP-S56-162617A) can be used in which the flow of a high-viscosity cellulose acrylate solution is enveloped with a low-viscosity cellulose acrylate solution, and the high-viscosity and low-viscosity cellulose acrylate solutions are simultaneously cast.

In addition, using two casting mouths, the cellulose acrylate film can also be prepared by casting a dope onto a support through a first casting mouth, peeling off the obtained film, and casting another dope onto a surface in contact with the surface of the support through a second casting mouth. As such a method, for example, a method described in JP1969-20235B (JPS44-20235B) can be used.

As the cellulose acylate solution for casting, the same kind or two or more different kinds of cellulose acylate solutions may be used. In order to make plural cellulose acylate layers have plural functions, it is only necessary that the respective cellulose acylate solutions corresponding to the functions be cast through the respective casting mouths. Moreover, the cellulose acylate solution according to the invention can be simultaneously cast along with solutions for other functional layers (for example, an adhesive layer, a dyeing layer, an antistatic layer, an annihilation layer, a UV absorption layer, and a polarizing layer).

Deterioration inhibitors (for example, an antioxidant, a peroxide decomposer, a radical inhibitor, a metal deactivator, an acid trapping agent, and an amine) may be added to the polarizing plate protective film. The deterioration inhibitors are described in JP1991-199201A (JP-H03-199201A), JP1993-1907073A (JP-H05-1907073A), JP1993-194789A (JP-H05-194789A), JP1993-271471A (JP-H05-271471A), and JP1994-107854A (JP-H06-107854A). In addition, the amount of the deterioration inhibitors added is preferably 0.01 mass % to 1 mass % and more preferably 0.01 mass % to 0.2 mass % with respect to the prepared solution (dope). When the amount added is greater than or equal to 0.01 mass %, the effects of the deterioration inhibitors can be sufficiently exhibited, which is preferable. When the amount added is less than or equal to 1 mass %, for example, the bleed-out and of the deterioration inhibitor onto a film surface is suppressed, which is preferable. Particularly preferable examples of the deterioration inhibitors include butylated hydroxy toluene (BHT) and tribenzylamine (TBA).

In addition, it is preferable that fine particles be added to the polarizing plate protective film as a matting agent. Examples of the fine particles which are used in the invention include silicon dioxide, titanium dioxide, aluminum oxide, zirconium oxide, calcium carbonate, talc, clay, calcined kaolin, calcined calcium silicate, calcium silicate hydrate, aluminum silicate, magnesium silicate, and calcium phosphate. As the fine particles, silicon is preferable, and silicon dioxide is particularly preferable from the viewpoint of reducing the haze of the film. In the fine particles of silicon dioxide, it is preferable that the primary average particle size be less than or equal to 20 nm, and the specific gravity is less than or equal to 70 g/L. The apparent specific gravity is preferably 90 g/L to 200 g/L and more preferably 100 g/L to 200 g/L. It is preferable that the apparent specific gravity be high because the concentration of the dispersant is increased, the film haze is reduced, and the formation of aggregates is prevented.

These fine particles usually form secondary particles having an average particle size of 0.1 μm to 3.0 μm. In the film, aggregates of primary particles of the fine particles are present, and projections having a size of 0.1 μm to 3.0 μm are formed on the film surface. The secondary average particle size is preferably 0.2 μm to 1.5 μm, more preferably 0.4 μm to 1.2 μm, and most preferably 0.6 μm to 1.1 μm. In order to measure the sizes of the primary and secondary particles, particles in the films are observed using a scanning electron microscope to measure the diameters of circumscribed circles of the particles. In addition, 200 particles at different positions are observed to measure the diameters thereof, and the average value thereof is obtained as an average particle size.

Examples of a commercially available product of silicon dioxide include AEROSIL R972, R972V, R974, R812, 200, 200V, 300, R202, OX50, and TT600 (all of which are manufactured by Nippon Aerosil). Examples of a commercially available product which can be used as the fine particles of zirconium oxide include AEROSIL R976 and R811 (all of which are manufactured by Nippon Aerosil).

Among these, AEROSIL 200V and AEROSIL R972V are fine particles of silicon oxide having a primary particle size of 20 nm or less and an apparent specific gravity of 70 g/L, and are particularly preferable because an effect of reducing a friction coefficient while reducing the haze of an optical film is high.

In the invention, in order to obtain a polarizing plate protective film which contains particles having a small secondary average particle size, when a dispersion of the fine particles is prepared, several methods are considered. For example, there is a method including: preparing in advance a fine particle dispersion obtained by stirring and mixing a solvent and fine particles; adding this fine particle dispersion to a small amount of cellulose acylate solution which is separately prepared; and mixing the obtained solution with a main cellulose acylate solution (dope solution). This preparation method is preferable from the viewpoints of obtaining high dispersibility of silicon dioxide fine particles and suppressing reaggregation of the silicon oxide fine particles. In addition, there is also another method including: adding a small amount of cellulose ester to a solvent; adding and stirring the obtained mixture; adding fine particles to the mixture; dispersing the mixture with a dispersing machine to obtain a fine particle-added solution; and sufficiently mixing this fine particle-added solution with a dope solution using an in-line mixer. The invention is not limited to these methods. However, when the silicon dioxide particles are mixed with a solvent and the like, followed by dispersing, the concentration of silicon dioxide is preferably 5 mass % to 30 mass %, more preferably 10 mass % to 25 mass %, and most preferably 15 mass % to 20 mass %. It is preferable that the dispersion concentration be high because the haze of the solution is reduced with respect to the amount added, and thus the haze of the film is reduced and the formation of aggregates is prevented. The final amount per 1 $m^3$ of the fine particles as a matting agent which are added to the dope solution of cellulose acylate is preferably 0.01 g to 1.0 g, more preferably 0.03 g to 0.3 g, and most preferably 0.08 g to 0.16 g.

Preferable examples the solvent to be used include lower alcohols such as methyl alcohol, ethyl alcohol, propyl alcohol, isopropyl alcohol, and butyl alcohol. Solvents other than the lower alcohols are not particularly limited, but it is preferable that a solvent which is used during the film formation of an cellulose ester be used.

These processes from the casting step to the drying step may be performed in the air atmosphere or in an inert gas atmosphere such as nitrogen gas. The winding machine which is used for manufacturing the polarizing plate protective film according to the invention may be any ordinary one. For example, the film may be wound according to various winding methods such as a constant tension method, a constant torque method, a tapered tension method, and a programmed tension control method where the internal stress is kept constant.

(Stretching Treatment)

The polarizing plate protective film can also be stretched. By the stretching treatment, a desired retardation can be imparted to the polarizing plate protective film. The stretching direction of the cellulose acylate film may be any one of a transverse direction and a longitudinal direction.

For example, a transverse stretching method is described in JP1987-115035A (JP-S62-115035), JP1992-152125A (JP-H04-152125), JP1992-284211A (JP-H04-284211), JP1992-298310A (JP-H04-298310), and JP1999-48271A (JP-H11-48271).

The film is stretched under heating conditions. The film can also be stretched during the drying treatment, which is particularly preferable when a solvent is remaining. In the case of longitudinal stretching, for example, the film is stretched by controlling the speed of a carrying roller of the film such that the winding speed of the film is higher than the peeling speed of the film. In the case of transverse stretching, the film can be stretched by carrying the film with a tenter while maintaining the width of the film and gradually increasing the width of the tenter. The film can also be stretched using a stretching machine (preferably, uniaxially stretched using a long stretching machine) after being dried.

The polarizing plate protective film is stretched, based on the glass transition temperature Tg of the polarizing plate protective film, preferably in a temperature range from (Tg−5° C.) to (Tg+40° C.), more preferably in a temperature range from Tg to (Tg+35° C.), and particularly preferably in a temperature range from (Tg+10° C.) to (Tg+30° C.). It is preferable that the dried film be stretched in a temperature range from 130° C. to 200° C.

In addition, when the film is stretched in a state where a doping solution is remaining after casting, the film can be stretched at a temperature which is lower than that of the case of the dried film. In this case, a temperature from 100° C. to 170° C. is preferable.

The stretch ratio (with respect to the film before being stretched) of the polarizing plate protective film is preferably 1% to 200% and more preferably 5% to 150%. In particular, It is preferable that the film be stretched in the transverse direction with a stretch ratio of preferably 1% to 200%, more preferably 5% to 150%, and particularly preferably 30% to 45%.

The stretching speed is preferably 1%/min to 300%/min, more preferably 10%/min to 300%/min, and most preferably 30%/min to 300%/min In addition, it is preferable that the polarizing plate protective film be stretched through a step (hereinafter, also referred to as "relaxing step") of stretching the film with a maximum stretch ratio and maintaining the film with a stretch ratio which is lower than the maximum stretch ratio. In the relaxing step, the stretch ratio is preferably 50% to 99%, more preferably 70% to 97%, and most preferably 90% to 95% with respect to the maximum stretch ratio. In addition, the time period of the relaxing step is preferably 1 second to 120 seconds and more preferably 5 seconds to 100 seconds.

It is more preferable that the method of manufacturing the polarizing plate protective film include a shrinking step of shrinking the film while holding the film in the transverse direction.

In the manufacturing step including the stretching step of stretching the film in the transverse direction of the film and the shrinking step of shrinking the film in the carrying direction (longitudinal direction) of the film, the film can be shrunk by holing the film with a pantograph type or a linear motor type tenter and reducing intervals between clips in the carrying direction while stretching the film in the width direction.

In the above-described method, at least a part of the stretching step and the shrinking step can be simultaneously preformed.

As a stretching machine for performing the stretching step stretching the film in one of the longitudinal direction or the transverse direction and shrinking the film in the other direction at the same time to increase the thickness of the film at the same time, a machine FITZ (manufactured by ICHKIN Co., Ltd.) or the like can be preferably used. This machine is described in JP2001-38802A.

As the stretch ratio in the stretching step and the shrinkage ratio in the shrinking step, appropriate values can be selected from values of the desired in-plane retardation Re and the retardation Rth in the thickness direction. However, it is preferable that the stretch ratio be higher than or equal to 10% in the stretching step and the shrinkage ratio be higher than or equal to 5% in the shrinking step.

In particular, it is preferable that the manufacturing method include a stretching step of stretching the film in the transverse direction of the film with a stretch ratio of 10% or higher; and a shrinkage step of shrinking the film in the carrying direction of the film with a shrinkage ratio of 5% or higher while holding the film in the transverse direction of the film.

The shrinkage ratio described in the invention the ratio of the length of the shrunk film to the length of the film before being shrunk in the shrinking direction.

The shrinkage ratio is preferably 5% to 40% and more preferably 10% to 30%.

(Saponification Treatment)

The adhesion of the polarizing plate protective film with a material of the polarizer such as polyvinyl alcohol is improved by an alkali saponification treatment. As a result, the obtained film can be used as the polarizing plate protective film.

A saponification method is described in paragraphs [0211] and [0212] of JP2007-86748A.

For example, it is preferable that the alkali saponification treatment be performed on the polarizing plate protective film in a cycle including: dipping a film surface in an alkali solution; neutralizing the film with an acidic solution; washing the film with water; and drying the film. Examples of the alkali solution include a potassium hydroxide solution and a sodium hydroxide solution. In this case, the concentration of hydroxide ions is preferably in a range from 0.1 mol/L to 5.0 mol/L and more preferably in a range from 0.5 mol/L to 4.0 mol/L. The temperature of the alkali solution is preferably in a range from room temperature to 90° C. and more preferably in a range from 40° C. to 70° C.

Instead of the alkali saponification treatment, an easy-adhesion treatment described in JP1994-94915A (JP-H06-94915A) and JP1994-118232A (JP-H06-118232A) may be performed.

<Method of Laminating Polarizer and Polarizing Plate Protective Film>

It is preferable that the method of manufacturing a polarizer according to the invention include a step of laminating two polarizing plate protective films on both surfaces of the polarizer obtained as above.

For laminating, an adhesive is used. Examples of the adhesive include an isocyanate-based adhesive, a polyvinyl alcohol-based adhesive, an epoxy-based adhesive, a gelatin-based adhesive, vinyl-based latex adhesive, and a water-based poly-ester adhesive. Among these, a polyvinyl alcohol-based adhesive is preferable from the viewpoints of obtaining superior transparency, adhesion, workability, product quality, and economical efficiency.

In addition, a solventless active energy ray-curable composition (hereinafter, also simply referred to as "epoxy-based adhesive composition") containing an alicyclic epoxy compound is also preferably used because a step of drying the adhesive is not required after a bonding step described below. By using the solventless active energy ray-curable composition containing an alicyclic epoxy compound, the durability of the polarizing plate in an extreme environment can be improved, and the step of drying the adhesive is not required. Therefore, the productivity is improved.

The alicyclic epoxy compound refers to a compound having an epoxy group directly in a ring of a saturated cyclic compound and a compound having a glycidyl ether group or a glycidyl group directly in a ring of a saturated cyclic compound. Another epoxy group may be included in the structure.

The alicyclic epoxy compound having an epoxy group directly in a ring of a saturated cyclic compound can be obtained, for example, using a method described in paragraphs [0074] to [0081] of JP2010-091603A.

Specific examples of the alicyclic epoxy compound having an epoxy group directly in a ring of a saturated cyclic compound which is preferably used in the invention, include 3,4-epoxycyclohexylmethyl 3,4-epoxycyclohexanecarboxylate, 1,2-epoxy-4-vinylcyclohexane, 1,2-epoxy-1-methyl-4-(1-methylepoxyethyl)cyclohexane, 3,4-epoxycyclohexylmethyl methacrylate, an adduct of 2,2-bis(hydroxymethyl)-1-butanol with 4-(1,2-epoxyethyl)-1,2-epoxycyclohexane, ethylene bis(3,4-epoxycyclohexanecarboxylate), oxydiethylene bis(3,4-epoxycyclohexanecarboxylate), 1,4-cyclohexanedimethyl bis(3,4-epoxycyclohexanecarboxylate), and 3-(3,4-epoxycyclohexylmethoxycarbonyl)propyl 3,4-epoxycicohexanecarboxylate.

The alicyclic epoxy compound having a glycidyl ether group or a glycidyl group directly in a ring of a saturated cyclic compound can be obtained, for example, using a method described in paragraphs [0083] to [0086] of JP2010-091603A.

Among the above-described alicyclic epoxy compounds, 3,4-epoxycyclohexylmethyl 3,4-epoxycyclohexanecarboxylate and hydrogenated products of bisphenol A with a glycidyl ether compound are preferable, and 3,4-epoxycyclohexylmethyl 3,4-epoxycyclohexanecarboxylate is more preferable, from the viewpoints of obtaining superior curable material properties or appropriate curability for improving the durability of the polarizing plate; and of obtaining the compound at a relatively low cost.

In addition, as the alicyclic epoxy compound, one kind thereof may be used alone, or a mixture of two or more kinds thereof may be used.

Such an alicyclic epoxy compound is commercially available, and examples of the commercially available product thereof include "CELLOXIDE" and "CYCLOMER" (both of which are manufactured by Daicel Corporation); and "CYRACURE" (manufactured by Dow Corning Corporation), all of which are trade names.

In the invention, an active energy ray-curable composition other than the alicyclic epoxy compound can be added to the epoxy-based adhesive composition. As such an active energy ray-curable composition, an epoxy compound other than the alicyclic epoxy compound can be used. By using the epoxy composition other than the alicyclic epoxy compound in combination, the adhesion between the polarizer and the polarizing plate protective film can be improved.

The epoxy composition other than the alicyclic epoxy compound and an oligomer thereof and the like are commercially available, and examples of the commercially available product include "EPICOAT" (manufactured by Japan Epoxy Resins Co., Ltd.), "EPICLON" (manufactured by DIC Corporation), "EPOTOHTO" (manufactured by Tohto Kasei Co., Ltd.), "ADEKARESIN" (manufactured by ADEKA Corporation), "DENACOL" (manufactured by Nagase ChemteX Corporation), "DOWEPDXY" (manufactured by The Dow Chemical Compoany), and "TEPIC" (manufactured by Nissan Chemical Industries Ltd.).

The epoxy equivalents of the alicyclic epoxy compound and the epoxy compound other than the alicyclic epoxy compound which are used in the invention are usually 30 g/eq to 2000 g/eq, preferably 50 g/eq to 1500 g/eq, and more preferably 70 g/eq to 1000 g/eq. The epoxy equivalent is a value measured according to JIS K 7236 (ISO 3001). In addition, when the epoxy compound is a high-purity monomer, the theoretical amount can be calculated from the molecular weight of the epoxy compound.

In addition, as the active energy ray-curable compound, an oxetane compound can also be used. By using the oxetane compound in combination, the curing rate of the active energy ray-curable composition can be improved. The oxetane compound is not particularly limited as long as it is a compound having an oxetane group which is curable with active energy rays, and examples thereof include 1,4-bis{[(3-ethyloxetane-3-yl)methoxy]methyl}benzene, 3-ethyl-3 (2-ethylhexyloxymethyl)oxetane, bis(3-ethyl-3-oxetanylmethyl)ether, 3-ethyl-3-(phenoxymethyl)oxetane, 3-ethyl-3-(cyclohexyloxymethyl)oxetane, phenol novolac oxetane, and 1,3-bis[(3-ethyloxetane-3-yl)-methoxy]benzene.

Such an oxetane compound is commercially available, and examples of the commercially available product include "ARONOXETANE" (manufactured by Toagosei Co., Ltd.) and "ETERNACOLL" (manufactured by Ube Industries Ltd.).

The mixing ratio of the alicyclic compound in the active energy ray-curable composition is preferably 30 parts by mass to 95 parts by mass, more preferably 50 parts by mass to 90 parts by mass, and still more preferably 70 parts by mass to 85 parts by mass with respect to 100 parts by mass of the total amount of all the active energy ray-curable compounds (the alicyclic epoxy compound, the epoxy compound other than the alicyclic epoxy compound, and the oxetane compound).

The total content of chlorine in the active energy ray-curable composition containing the alicyclic epoxy compound which is used in the invention is preferably in a range from 0.1 ppm to 15000 ppm, more preferably in a range from 0.5 ppm to 2000 ppm, and still more preferably in a range from 1.0 ppm to 1000 ppm. This total content of chlorine is a value measured according to JIS K 7243-3 (ISO 21627-3).

The color of the active energy ray-curable composition containing the alicyclic epoxy compound which is used in the invention is preferably less than or equal to 5, more preferably less than or equal to 3, and still more preferably less than or equal to 1 in terms of the Gardner color of the active energy ray-curable composition before curing.

The active energy ray-curable composition containing the alicyclic epoxy compound which is used in the invention is a curable composition which is cured (solidified) by the irradiation with active energy rays to thereby impart the adhesion to films between which a cured material layer of the curable composition is interposed.

Examples of active energy rays to be used include X-rays with a wavelength of 1 μm to 10 nm, ultraviolet rays with a wavelength of 10 nm to 400 nm, and visible light rays with a wavelength of 400 nm to 800 nm. Among these, ultraviolet rays are preferably used from the viewpoints of easy handleability, easy preparation and stability of the active energy ray-curable composition, and curing performance thereof.

A light source to be used is not particularly limited, and examples thereof include light sources having a light emission distribution at a wavelength of 400 nm or shorter, for example, a low pressure mercury lamp, a medium pressure mercury lamp, a high pressure mercury lamp, an ultra-high pressure mercury lamp, a chemical lamp, a black light lamp, a microwave-excited mercury vapor, and a metal halide lamp.

The irradiation intensity is determined according to the active energy ray-curable composition and the irradiation time and is not particularly limited. For example, the irradiation intensity which is effective for activating an initiator is preferably 0.1 mW/cm$^2$ to 1000 mW/cm$^2$.

The irradiation time is determined according to the active energy ray-curable composition and the irradiation intensity and is not particularly limited. For example, it is preferable that the irradiation time be set such that the integrated light intensity which is represented by a product of the irradiation intensity and the irradiation time is 10 mJ/cm$^2$ to 5000 mJ/cm$^2$.

It is preferable that the active energy ray-curable composition containing the alicyclic epoxy compound which is used in the invention contain a cationic polymerization initiator because the composition is cured by active energy rays.

As the cationic polymerization initiator, one kind thereof may be used alone, or a mixture of two or more kinds thereof may be used. Among these, an aromatic sulfonium salt is particularly preferable because it has ultraviolet absorbing properties even in a wavelength range of 300 nm or longer, is superior in curability, and can form a cured material layer having superior mechanical strength and adhesion strength.

The amount of the cationic polymerization initiator is usually 0.5 parts by mass to 20 parts by mass and preferably 1 part by mass to 15 parts by mass with respect to 100 parts by mass of the total amount of the active energy ray-curable compounds.

The cationic polymerization initiator is commercially available, and examples of the commercially available product include KAYARAD (manufactured by Nippon Kayaku Co., Ltd.), "CYRACURE" (manufactured by Union Carbide Corporation), a photoacid generator "CPI" (manufactured by San-Apro Ltd.), photoacid generators "TAZ", "BBI", and "DTS" (manufactured by Midori Kagaku Co., Ltd.), "ADEKA OPTOMER" (manufactured by ADEKA Corporation), and "RHODORSIL" (manufactured by Rhodia Inc.).

Optionally, the active energy ray-curable composition containing the alicyclic epoxy compound which is used in the invention can be used in combination with a photosensitizer. By using the photosensitizer in combination, the reactivity can be improved, and the mechanical strength and adhesion strength of the cured material layer can be improved.

The photosensitizer is not particularly limited, and examples thereof include carbonyl compounds, organic sulfur compounds, persulfides, redox-based compounds, azo and diazo compounds, halogen compounds, and photo-reducing pigments.

As the photosensitizer, one kind thereof may be used alone, or a mixture of two or more kinds thereof may be used. When the total mass of the active energy ray-curable composition is represented by 100 parts by mass, the content of the photosensitizer is preferably in a range from 0.1 parts by mass to 20 parts by mass.

Various additives may be added to the active energy ray-curable composition which is used in the invention within a range not impairing the effects of the invention. Examples of the additives include an ion trapping agent, an antioxidant, a chain transfer agent, a sensitizer, a tackifier, a thermoplastic resin, a filler, a fluidity controlling agent, a plasticizer, and an anti-foaming agent.

It is preferable that the polarizing plate be manufactured by bonding the polarizing plate protective film and the polarizer through the adhesive. The adhesive may be coated either or both of the polarizing protective film and the polarizer. After bonding, the drying step is performed to form an adhesive layer formed by coating and drying. The bonding of the polarizer and the polarizing plate protective film can be performed using a roll laminator or the like. The thickness of the adhesive layer is not particularly limited but is usually about 0.1 μm to 5 μm.

<Adhesive Layer>

The polarizing plate according to the invention includes an adhesive layer for bonding with another optical film or another member such as a liquid crystal cell.

The creep amount of the adhesive layer included in the polarizing plate according to the invention is less than 100 μm when measured in a creep test under conditions of a temperature of 25° C., a relative humidity of 60%, a load of 1 kg, and a load applying time of 1 hour. The creep amount of the adhesive layer is preferably 10 μm to 90 μm and more preferably 20 μm to 60 μm.

In a heat cycle where environments of a liquid crystal display are repeated, for example, high humidity→low humidity→high humidity→ . . . , which is the problem to be solved by the invention, a polarizing plate for a viewing side is repeatedly expanded and shrunk by absorption and diffusion of water.

On the other hand, a polarizing plate for a backlight side where the entrance and exit of the air is small due to a housing is barely expanded and shrunk.

Due to expansion→shrinkage or shrinkage→expansion of the above-described polarizing plate for a viewing side, a strong stress is applied to a glass substrate on the front side of a liquid crystal panel through the adhesive layer. Accordingly, the liquid crystal panel is warped, which causes the light leakage (display unevenness) on the four corners.

In general, it is known that, when being left to stand in an environment where humidity changes or in a heating environment, an adhesive layer having a small creep amount in the creep test cannot follow dimensional changes caused by the humidity expansion and shrinkage of the polarizer and the like. However, this is the result when the expansion force and shrinkage force of the polarizer are high. In the polarizing plate according to the invention of which the shrinkage force is low, the expansion and shrinkage of the polarizing plate by humidity can be suppressed by the deformation (creep) of the adhesive.

In this way, according to the invention, by combining the adhesive having a small creep amount with the polarizing plate for a viewing side having a low shrinkage force (expansion force), the actual dimensional change of the polarizing plate for a viewing side is suppressed, and the warpage of a liquid crystal panel is prevented.

The specific method of measuring the creep amount of the adhesive layer is as follows.

A polarizing plate test specimen (25 mm×50 mm) is bonded to an alkali-free glass plate (size: 50 mm×100 mm, thickness: 1.0 mm) through an adhesive such that the adhesive area is 10 mm×25 mm, followed by being left to stand for 1 hour in an environment of a temperature of 25° C. and a relative humidity of 60%. Next, this test specimen is fixed such that a long side of the test specimen faces a vertical direction, and a load of 1 kg is applied to an end of the test specimen for 1 hour in an environment of a temperature of 25° C. and a relative humidity of 60%. At this time, the deviation amount from the initial state is calculated as the creep amount.

In order to form the adhesive layer, an appropriate adhesive can be used, and the kind thereof is not particularly limited. Examples of the adhesive include rubber-based adhesives, acrylic adhesives, silicone-based adhesives, urethane-based adhesives, vinyl alkyl ether-based adhesives, polyvinyl alcohol-based adhesives, polyvinyl pyrrolidone-based adhesives, polyacrylamide-based adhesives, and cellulose-based adhesives.

The creep amount of the adhesive layer can be controlled to be less than 100 μm by controlling, for example, the thickness of the thickness of the adhesive layer, the kinds and mixing ratios of the base monomers and the copolymerizable monomers, the kind of the crosslinking agent, and the kinds and mixing ratios of the additives. For example, a method of controlling the molecular weight of a base polymer of the adhesive, a method of copolymerizing monomers having different glass transition temperatures, different cohesive properties and the like, or a method of controlling the addition amount of the crosslinking agent to control the crosslinking degree is effectively used. In general, when the amount of the crosslinking agent is increased, the crosslinking degree is increased, and the creep amount tends to be reduced. In addition, when the thickness of the adhesive layer is reduced, the creep amount tends to be reduced.

Among the above-described adhesives, an adhesive having superior optical transparency; appropriate adhesive properties such as wettability, cohesiveness, and adhesion; and superior weather resistance and heat resistance is preferably used. As the adhesive having such characteristics, an acrylic adhesive is preferably used. In particular, an adhesive containing an acrylic polymer and a crosslinking agent can be preferably used.

The acrylic adhesive contains an acrylic polymer as a base polymer, the acrylic polymer containing a monomer unit of (meth)acrylic acid alkyl ester as the main skeleton. The (meth)acrylic acid alkyl ester represents an acrylic acid alkyl ester and/or a methacrylic acid alkyl ester, which has the same definition as "(meth)" according to the invention. As the (meth)acrylic acid alkyl ester which forms the main skeleton of the acrylic polymer, for example, a linear or branched alkyl group having 1 to 20 carbon atoms can be used. Examples of the linear or branched alkyl group having 1 to 20 carbon atoms include methyl (meth)acrylate, ethyl (meth)acrylate, propyl (meth)acrylate, butyl (meth)acrylate, 2-ethylhexyl (meth)acrylate, isooctyl (meth)acrylate, isononyl (meth) acrylate, isomyristyl (meth)acrylate, and lauryl (meth)acrylate. As the linear or branched alkyl group having 1 to 20 carbon atoms, one kind thereof may be used alone, or two or more kinds thereof may be used in combination. The average number of carbon atoms of the alkyl groups is preferably 3 to 9.

It is preferable that the above-described acrylic polymer contain an acrylic polymer as a base polymer from the viewpoint of reducing the equilibrium moisture regain, the acrylic polymer containing a highly hydrophobic monomer unit of (meth)acrylic acid alkyl ester as the main skeleton. Typically, as the (meth)acrylic acid alkyl ester, a linear or branched having 3 to 9 carbon atoms, preferably 4 to 8 carbon atoms is preferably used in practice from the viewpoints of obtaining the above-described optical transparency; appropriate wettability, cohesiveness, and adhesion; and superior weather resistance and heat resistance. It is preferable that the number of carbon atoms in the alkyl group be large from the viewpoints of increasing hydrophobicity and reducing the equilibrium moisture regain. Examples of the (meth)acrylic acid alkyl ester include butyl (meth)acrylate and isooctyl (meth) acrylate. Among these, isooctyl (meth)acrylate having high hydrophobicity is preferable.

In order to improve adhesion and heat resistance, one or more kinds of copolymerizable monomers can be incorporated to the acrylic polymer by copolymerization. Specific examples of the copolymerizable monomers include hydroxyl group-containing monomers such as 2-hydroxyethyl (meth)acrylate, 2-hydroxypropyl (meth)acrylate, 4-hydroxybutyl (meth)acrylate, 6-hydroxyhexyl (meth)acrylate, 8-hydroxyoctyl (meth)acrylate, 10-hydroxydecyl (meth) acrylate, and 12-hydroxylauryl (meth)acrylate, and (4-hydroxymethyl cyclohexyl)-methyl acrylate; carboxyl group-containing monomers such as (meth)acrylic acid, carboxyethyl (meth)acrylate, carboxypentyl (meth)acrylate, itaconic acid, maleic acid, fumaric acid, and crotonic acid; acid anhydride group-containing monomers such as maleic anhydride and itaconic anhydride; caprolactone adducts of acrylic acids; sulfonic group-containing monomers such as styrenesulfonic acid, allylsulfonic acid, 2-(meth)acrylamide-2-methylpropanesulfonic acid, (meth)acrylamidepropane sulfonic acid, sulfopropyl (meth)acrylate, and (meth)acryloyloxynaphthalenesulfonic acid; and phosphoric acid group-containing monomers such as 2-hydroxyethylacryloyl phosphate.

In addition, examples of monomers for modification include (N-substituted)amide monomers such as (meth)acrylamide, N,N-dimethyl (meth)acrylamide, N-butyl (meth) acrylamide, N-methylol (meth)acrylamide, and N-methylolpropane (meth)acrylamide; alkylaminoalkyl (meth)acrylate monomers such as aminoethyl (meth)acrylate, N,N-dimethylaminoethyl (meth)acrylate, and tert-butylaminoethyl (meth) acrylate; alkoxyalkyl (meth)acrylate monomers such as methoxyethyl (meth)acrylate, and ethoxyethyl (meth)acrylate; succinimide monomers such as N-(meth)acryloyloxymethylenesuccinimide, N-(meth)acryloyl-6-oxyhexamethylenesuccinimide, N-(meth)acryloyl-8-oxyoctamethylenesuccinimide, and N-acryloylmorpholine; maleimide monomers such as N-cyclohexylmaleimide, N-isopropylmaleimide, N-laurylmaleimide, and N-phenylmaleimide; and itaconimide monomers such as N-methylitaconimide, N-ethylitaconimide, N-butylitaconimide, N-octylitaconimide, N-2-ethylhexylitaconimide, N-cyclohexylitaconimide, and N-laurylitaconimide Other examples of the monomers for modification include vinyl monomers such as vinyl acetate, vinyl propionate, N-vinylpyrrolidone, methylvinylpyrrolidone, vinylpyridine, vinylpiperidone, vinylpyrimidine, vinylpiperazine, vinylpyrazine, vinylpyrrole, vinylimidazole, vinyloxazole, vinylmorpholine, N-vinylcarboxylic acid amides, styrene, α-methylstyrene, and N-vinylcaprolactam; cyano acrylate monomers such as acrylonitrile, and methacrylonitrile; epoxy group-containing acrylic monomers such as glycidyl (meth) acrylate; glycol acryl ester monomers such as polyethylene glycol (meth)acrylate, polypropylene glycol (meth)acrylate, methoxyethylene glycol (meth)acrylate, and methoxypolypropylene glycol (meth)acrylate; and acrylic acid ester monomers such as tetrahydrofurfuryl (meth)acrylate, fluorine (meth)acrylate, silicone (meth)acylate, and 2-methoxyethyl acrylate.

The ratio of the copolymerizable monomers in the acrylic monomers is not particularly limited, but is preferably 0% to 30% and preferably 0.1% to 15% with respect to the mass ratio of all the constituent monomers.

Among the copolymerizable monomers, the hydroxyl group-containing monomers, the carboxyl group-containing monomers, and the acid anhydride group-containing monomers are preferably used from the viewpoints of obtaining superior adhesion with a liquid crystal cell and durability for use in an optical film. These monomers function as a reactive site with the crosslinking agent. The hydroxyl group-containing monomers, the carboxyl group-containing monomers, and the acid anhydride group-containing monomers are highly reactive with intermolecular crosslinking agents and thus are preferably used for improving the cohesiveness or heat resistance of the obtained adhesive layer. For example, among the hydroxyl group-containing monomers, rather than 2-hydroxyethyl (meth)acrylate, 4-hydryoxybutyl (meth)acrylate is preferable, and 6-hydroxyhexyl (meth)acrylate is more preferable. In this way, a monomer having more alkyl groups in the hydroxyalkyl group is preferable. When the hydroxyl group-containing monomer is used as the copolymerizable monomer, the ratio thereof is 0.01% to 5% and preferably 0.01% to 3% with respect to the mass ratio of all the constituent monomers. In addition, when the carboxyl group-containing monomer is used as the copolymerizable monomer, the ratio thereof is 0.01% to 10% and preferably 0.01% to 7% with respect to the mass ratio of all the constituent monomers.

The average molecular weight of the acrylic polymer is not particularly limited, but the weight average molecular weight thereof is preferably about 100,000 to 2,500,000. In addition, the acrylic polymer can be prepared using various well-known methods. For example, a radical polymerization method such as a bulk polymerization method, a solution polymerization method, or a suspension polymerization method can be appropriate selected. As a radical polymerization initiator, well-known initiators such as azo-based or peroxide-based initiators can be used. The reaction temperature is usually about 50° C. to 80° C., and the reaction time is 1 hour to 8 hours. In addition, among the monomer preparation methods, a solution polymerization method is preferable, and ethyl acetate, toluene, and the like are usually used as a solvent of the acrylic polymers. The solution concentration is usually about 20 mass % to 80 mass %.

In addition, it is preferable that the adhesive be an adhesive composition containing a crosslinking agent. Examples of a polyfunctional compound which can be added to the adhesive include an organic crosslinking agent and a polyfunctional metal chelate. Examples of the organic crosslinking agent include an epoxy crosslinking agent, an isocyanate crosslinking agent, an imine crosslinking agent, and a peroxide crosslinking agent. As the crosslinking agent, one kind thereof may be used alone, or two or more kinds thereof may be used in combination. As the organic crosslinking agent, an isocyanate crosslinking agent is preferable. In addition, an isocyanate crosslinking agent is preferably used in combination with a peroxide crosslinking agent. The polyfunctional metal chelate is a compound in which a polyvalent metal is covalently or coordinately bonded to an organic compound. Examples of the polyvalent metal atom include Al, Cr, Zr, Co, Cu, Fe, Ni, V, Zn, In, Ca, Mg, Mn, Y, Ce, Sr, Ba, Mo, La, Sn, and Ti. Examples of an atom in the organic compound to which the polyvalent metal is covalently or coordinately bonded include an oxygen atom. Examples of the organic compound include alkyl esters, alcohol compounds, carboxylic acid compounds, ether compounds, and ketone compounds.

The mixing ratio of the base polymer such as the acrylic polymer and the crosslinking agent is not particularly limited. However, typically, the amount (solid content) of the crosslinking agent is preferably 0.001 parts by mass to 20 parts by mass and more preferably 0.01 parts by mass to 15 parts by mass with respect to 100 parts by mass of the amount (solid content) of the base polymer. As the crosslinking agent, an isocyanate crosslinking agent and a peroxide crosslinking agent are preferable. The amount (solid content) of the peroxide crosslinking agent is preferably 0.01 parts by mass to 3 parts by mass, more preferably 0.02 parts by mass to 2.5 parts by mass, and still more preferably 0.05 parts by mass to 2.0 parts by mass with respect to 100 parts by mass of the amount (solid content) of the base polymer. The amount (solid content) of the isocyanate crosslinking agent is preferably 0.001 parts by mass to 2 parts by mass and more preferably 0.01 parts by mass to 1.5 parts by mass by mass with respect to 100 parts by mass of the amount (solid content) of the base polymer. In addition, the isocyanate crosslinking agent and the peroxide crosslinking agent can be used in the above-described ranges and can also be preferably used in combination.

Optionally, various additives such as a silane coupling agent, a tackifier, a plasticizer, a glass fiber, a glass bead, an antioxidant, an ultraviolet absorber, and transparent fine particles can be appropriately added to the adhesive within a range not departing from the object of the invention.

As the additive, a silane coupling agent is preferable. The amount (solid content) of the silane coupling agent added is preferably about 0.001 parts by mass to 10 parts by mass and more preferably about 0.005 parts by mass to 5 parts by mass with respect to 100 parts by mass of the amount (solid content) of the base polymer. As the silane coupling agent, any well-known silane coupling agent of the related art can be used without particular limitation. Examples of the silane coupling agent include epoxy group-containing silane coupling agents such as γ-glycidoxypropyltrimethoxysilane, γ-glycidoxypropyltriethoxysilane, γ-glycidoxypropylmethyldiethoxysilane, and 2-(3,4-epoxycyclohexyl)ethyltrimethoxysilane; amino group-containing silane coupling agents such as 3-aminopropyltrimethoxysilane, N-2-(aminoethyl)-3-aminopropylmethyldimethoxysilane, and 3-triethoxysilyl-N-(1,3-dimethylbutylidene)propylamine; (meth)acryl group-containing silane coupling agents such as 3-acryloxypropyltrimethoxysilane and 3-methacryloxypropyltriethoxysilane; and isocyanate group-containing silane coupling agents such as 3-isocyanatepropyltriethoxysilane.

The adhesive layer is provided on the polarizing plate using an appropriate method. Examples of the method include a method including dissolving or dispersing a base polymer or a composition thereof in a solvent of only one kind or a mixture of two or more kinds selected from appropriate solvents such as toluene and ethyl acetate to prepare an adhesive solution having a concentration of 10 mass % to 40 mass %; and directly providing the adhesive solution on a polarizing plate or an optical member with an appropriate spreading method such as a casting method or a coating method; and a method including forming an adhesive layer on a separator corresponding to the above-described separator and transferring the adhesive layer onto a polarizing plate.

In the polarizing plate according to the invention, it is preferable that the polarizing plate protective film be bonded to the polarizer such that a transmission axis of the polarizer is substantially parallel to a slow axis of the polarizing plate protective film.

"Substantially parallel" described herein represents a direction of a principal refractive index nx of the polarizing plate protective film containing the above-described organic acid and a direction of the transmission axis of the polarizing plate are deviated from each other by less than 5°, preferably by less than 1°, and more preferably by 0.5°. If the deviation is less than 1°, when the polarizing plates are arranged to be in a crossed Nicol state, polarizing efficiency performance is not likely to deteriorate.

<Functionalization of Polarizing Plate>

The polarizing plate according to the invention is preferably used as a functional polarizing plate by being combined with an optical film including a functional layer such as an antireflective film, a brightness enhancement film, a hard coating layer, a forward scattering layer, or an anti-glaring layer in order to improve visibility of a display. The antireflective film and the brightness enhancement film for functionalization, other functional optical films, the hard coating layer, the forward scattering layer, and the anti-glaring layer are described in paragraphs [0257] to [0276] of JP2007-86748A. Based on this description, a functional polarizing plate can be prepared.

It is preferable that the polarizing plate according to the invention be used as a polarizing plate for a viewing side of a liquid crystal display.

[Liquid Crystal Display]

A liquid crystal display according to the invention includes the polarizing plate according to the invention on a viewing side, in which the adhesive layer included in the polarizing plate is arranged opposite a liquid crystal cell side.

Figure 2:
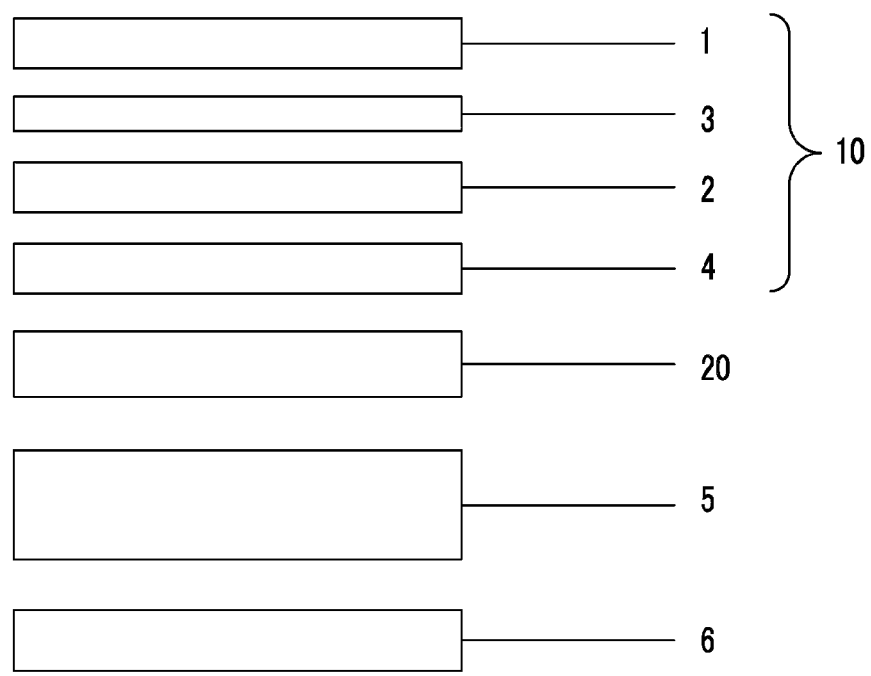
FIG. 2 is a schematic diagram illustrating an example of a liquid crystal display according to the invention.

FIG. 2 is a schematic diagram illustrating a preferable example of the liquid crystal display according to the invention.

In a liquid crystal display 100 illustrated in FIG. 2, a polarizing plate 10 according to the invention is provided on a viewing side, and an adhesive layer 4 is provided on a side of a liquid crystal cell 20. In addition, the liquid crystal display 100 includes a backlight 6, and another polarizing plate 5 is provided on the side of the backlight 6. The polarizing plate 5 on the backlight side is not particularly limited, and the same polarizing plate as the polarizing plate on the viewing side or a well-known polarizing plate may be used.

The liquid crystal cell includes a liquid crystal layer and two glass substrates that are provided on both sides of the liquid crystal layer. The thickness of the glass substrates is preferably less than or equal to 0.5 mm, more preferably less than or equal to 0.4 mm, and particularly preferably less than or equal to 0.3 mm. In the above-described range, the effects of the invention are significant.

The liquid crystal cell of the liquid crystal display according to the invention is preferably the IPS mode, the VA mode, or the FFS mode and is more preferably the IPS mode.

EXAMPLES

Hereinafter, the invention will be described in detail referring to examples. In the following examples, materials, reagents, the amounts of the materials and the ratios thereof, operations, and the like can be appropriately changed within a range not departing from the concepts of the invention. Therefore, the scope of the invention is not limited to the following specific examples.

[Preparation of Polarizing Plate Protective Film LA1]

90 parts by mass of (meth)acrylic resin (mass ratio of copolymerizable monomers: methyl methacrylate/methyl 2-(hydroxymethyl)acrylate=8/2, lactone cyclization ratio: about 100%, content of lactone ring structure: 19.4%, weight average molecular weight: 133000, melt flow rate: 6.5 g/10 min (240° C., 10 kgf), Tg: 131° C.) having a lactone ring structure represented by the following formula (IA); and 10 parts by mass of acrylonitrile-styrene (AS) resin (TOYO AS AS20, manufactured by Toyo-Styrene Co., Ltd.) were mixed with each other to obtain a mixture (Tg: 127° C.) as a pellet. This pellet was supplied to a twin screw extruder and was extruded into a sheet shape at about 280° C. As a result, a (meth)acrylic resin sheet having a thickness of 80 μm which includes a lactone ring structure was obtained. This unstretched sheet was stretched to 1.5 times in the longitudinal direction and 1.8 times in the transverse direction under a temperature condition of 160° C., thereby obtaining a (meth)acrylic resin film LA1. The transparency of the obtained (meth)acrylic resin film LA1 was 94 g/m²/24 hours.

[Chem. 12]

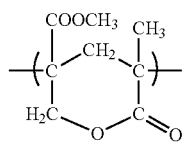

(1A)

[Preparation of Polarizing Plate Protective Films LA2 and LA3]

(Thermoplastic Resin)

The following acrylic resin was used. The acrylic resin can be commercially available or synthesized using a well-known synthesis method.

PMMA: DIANAL BR88 (trade name), manufactured by Mitsubishi Rayon Co. Ltd. (weight average molecular weight: 1500000)

(Moisture Permeability-Reducing Compound)

Moisture permeability-reducing compounds having structures represented by the following formulae (B-7) and (1C) were used.

[Chem. 13]

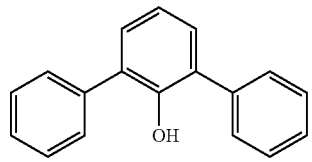

B-7

(Available from Wako Pure Chemical Industries Ltd., Molecular Weight: 247)

[Chem. 14]

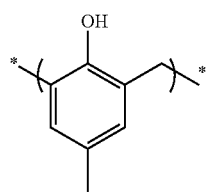

(1C)

P-cresol novolac resin
(weight average molecular weight: about 2500)

(Ultraviolet Absorber)

The following ultraviolet absorber was used.

UV absorber 1: TINUVIN 328 (manufactured by Ciba Specialty Chemicals Co., Ltd.)

(Brittleness Modifier)

The following brittleness modifiers were used.

Brittleness modifier 1: LA 4285, manufactured by Kuraray Co., Ltd.

Brittleness modifier 2: KANE ACE M210, manufactured by Kaneka Corporation (Preparation of Dope)

The following composition was put into a mixing tank and was stirred while being heated to dissolve the respective components, thereby preparing a dope.

(Dope Composition of LA2)

| PMMA Resin | 100 parts by mass |
| Moisture permeability-reducing compound B-7 | 10 parts by mass |
| UV absorber 1 | 2.4 parts by mass |
| Brittleness modifier 1 | 5.0 parts by mass |
| Dichloromethane | 534 parts by mass |
| Methanol | 46 parts by mass |

(Dope Composition of LA3)

| PMMA Resin | 100 parts by mass |
| Moisture permeability-reducing compound 1C | 30 parts by mass |
| Brittleness modifier 2 | 5.0 parts by mass |
| Dichloromethane | 534 parts by mass |
| Methanol | 46 parts by mass |

Using a band casting machine, the prepared dope was uniformly cast from a casting die onto a stainless steel endless band (casting support) at a width of 2000 mm. When the amount of the residual solvent in the dope was 15 mass %, a polymer film was peeled off from the casting support, was carried by a tenter while being not actively stretched, and was dried in a drying zone at 120° C.

The final thicknesses of the obtained polarizing plate protective films LA2 and LA3 were 35 μm and 42 μm, respectively.

[Preparation of Polarizer P1]

200 kg of water with a temperature of 18° C. was put into a 500 L tank, and 42 kg of polyvinyl alcohol resin having a weight average molecular weight of 165000 and a saponification degree of 99.8 mol % was added thereto under stirring, followed by further stirring 15 minutes. The obtained slurry was dehydrated to obtain a polyvinyl alcohol resin wet cake having a water content of 40 mass %.

70 kg of the obtained polyvinyl alcohol resin wet cake (the amount of the resin: 42 kg) was put into a dissolution bath, 4.2 kg of glycerin as a plasticizer and 10 kg of water were added thereto, and water vapor was blown thereto from the bottom of the bath. When the internal resin temperature was 50° C., the solution was stirred (rotating speed: 5 rpm). When the internal resin temperature was 100° C., a pressure was applied to the inside of the system, followed by heating to 150° C. Then, the blowing of water vapor was stopped (the total amount of water vapor blown was 75 kg). The solution was stirred (rotating speed: 20 rpm) for 30 minutes to uniformly dissolve the components, followed by concentration control. As a result, an aqueous polyvinyl alcohol resin solution having a polyvinyl alcohol resin concentration of 23 mass % with respect to water was obtained.

Next, the aqueous polyvinyl alcohol resin solution (liquid temperature: 147° C.) was supplied to a twin axis extruder by a gear pump, was degassed, and was discharged by the gear pump. The discharged aqueous polyvinyl alcohol resin solution was cast from a T-slit die (straight manifold die) onto a casting drum to form a film. Casting conditions were as follows.

Diameter (R1) of casting drum: 3200 mm
Width of casting drum: 4.3 m
Rotating speed of casting drum: 8 m/min
Surface temperature of casting drum: 90° C.
Resin temperature at outlet of T-slit die: 95° C.

The obtained film were dried under the following conditions while allowing front and back surfaces of the film to alternately pass through plural drying rolls.

Diameter (R2) of Drying Roll: 320 mm
Width of drying roll: 4.3 m
Number (n) of drying rolls: 10
Rotating speed of drying roll: 8 m/min
Surface temperature of drying roll: 50° C.

The prepared polyvinyl alcohol film (length: 4000m, width: 4 m, thickness: 70 μm) was dipped in warm water at 40° C. for 2 minutes to be swollen and was stretched to 1.30 times as a primary stretching treatment. The obtained film was dipped in an aqueous solution containing 28.6 g/L of boric acid (manufactured by Societa Chimica Larderello s.p.a), 0.25 g/L of iodine (manufactured by Junsei Chemical Co., Ltd.), and 1.0 g/L of potassium iodide (manufactured by Junsei Chemical Co., Ltd.) at 30° C. for 2 minutes to be subjected to a dyeing treatment using iodine and iodide. The obtained film subjected to the dyeing treatment was treated in an aqueous solution containing 30.0 g/L of boric acid at 50° C. for 5 minutes while being uniaxially stretched to with a stretch ratio of 5.0 times as a secondary stretching treatment. The obtained film was dried at 70° C. for 9 minutes.

[Preparation of Polarizers P2 and P3]

Polarizers P2 and P3 were prepared with the same preparation method as that of the polarizer P1, except that the original thickness of the polyvinyl alcohol film, the respective stretch ratios of the primary and secondary stretching treatments, and the thickness of the polarizer were changed as shown in the following Table 1.

TABLE 1

| Polarizer No. | Original Thickness of PVA (μm) | Stretch Ratio of Primary Stretching Treatment (Times) | Stretch Ratio of Secondary Stretching Treatment (Times) | Final Thickness of Polarizer (μm) |
|---|---|---|---|---|
| P1 | 70 | x1.30 | x5 | 28 |
| P2 | 40 | x1.30 | x5 | 16 |
| P3 | 25 | x1.30 | x5 | 10 |

[Method of Preparing Cellulose Acylate Film]

(Preparation of Cellulose Ester Solution D-1)

The following composition was put into a mixing tank and was stirred while being heated to dissolve the respective components, thereby preparing a cellulose ester solution D-1.

Composition of Cellulose Ester Solution D-1

| Cellulose ester (acetylation degree: 2.86, viscosity average polymerization degree: 310) | 100 parts by mass |
| Sugar ester compound 1 | 3.0 parts by mass |
| Sugar ester compound 2 | 1.0 part by mass |
| Methylene chloride | 375 parts by mass |

| | |
|---|---|
| Methanol | 82 parts by mass |
| Butanol | 5 parts by mass |

[Chem. 15]
(Sugar Ester Compound 1)

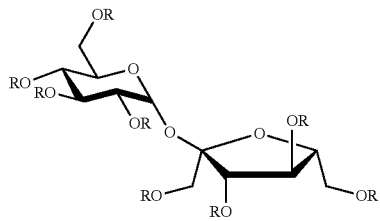

R = Benzoyl Group or Hydrogen Atom
Average Substitution Degree: 5.7

[Chem. 16]
(Sugar Ester Compound 2)

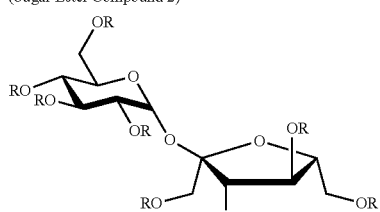

R = Acetyl Group/Butyryl Group (Substitution Degree 2/6)
Average Substitution Degree: 8.0

(Preparation of Matting Agent Dispersion M-1)

The following composition was put into a disperser and was stirred to dissolve the respective components, thereby preparing a matting agent dispersion M-1.

Composition of Matting Agent Dispersion M-1

| | |
|---|---|
| Silica particle dispersion (average particle size: 16 nm, "AEROSIL R972", manufactured by Nippon Aerosil) | 10.0 parts by mass |
| Methylene chloride | 62.5 parts by mass |
| Methanol | 14.1 parts by mass |
| Butanol | 0.8 parts by mass |
| Cellulose ester solution D-1 | 10.3 parts by mass |

(Preparation of Ultraviolet Absorber Solution U-1)

The following composition was put into another mixing tank and was stirred while being heated to dissolve the respective components, thereby preparing an ultraviolet absorber solution U-1.

Composition of Ultraviolet Absorber Solution U-1

| | |
|---|---|
| Ultraviolet Absorber (UV-1) | 10.0 parts by mass |
| Ultraviolet Absorber (UV-2) | 10.0 parts by mass |
| Methylene chloride | 54.3 parts by mass |
| Methanol | 12.0 parts by mass |
| Butanol | 0.7 parts by mass |
| Cellulose ester solution D-1 | 12.9 parts by mass |

[Chem. 17]

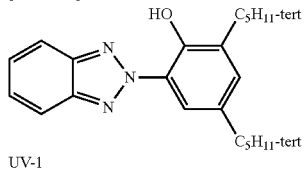

UV-1

[Chem. 18]

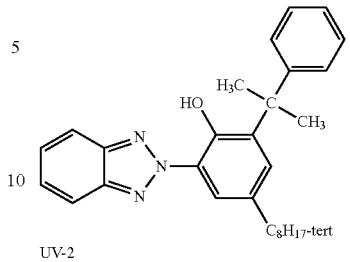

UV-2

(Preparation of Core Layer Dope)

6.0 parts by mass of the sugar ester compound 1 and 2.0 parts by mass of the sugar ester compound 2 were added to the cellulose ester solution D-1 per 100 parts by mass of cellulose ester. Moreover, the ultraviolet absorber solution U-1 was added such that each amount of the ultraviolet absorber (UV-1) and the ultraviolet absorber (UV-2) was 1.2 parts by mass. The obtained solution was sufficiently stirred while being heated to dissolve the respective components, thereby preparing a dope.

Preparation of Surface Layer Dope 1

The ultraviolet absorber solution U-1 was added to the cellulose ester solution D-1 such that each amount of the ultraviolet absorber (UV-1) and the ultraviolet absorber (UV-2) was 1.2 parts by mass per 100 parts by mass of cellulose ester. Moreover, the matting agent dispersion M-1 was added to the solution such that the amount of silica particles was 0.026 parts by mass per 100 parts by mass of cellulose ester. The obtained solution was sufficiently stirred while being heated to dissolve the respective components, thereby preparing a dope.

Preparation of Surface Layer Dope 2

The ultraviolet absorber solution U-1 was added to the cellulose ester solution D-1 such that each amount of the ultraviolet absorber (UV-1) and the ultraviolet absorber (UV-2) was 1.2 parts by mass per 100 parts by mass of cellulose ester. Moreover, the matting agent dispersion M-1 was added to the solution such that the amount of silica particles was 0.078 parts by mass per 100 parts by mass of cellulose ester. The obtained solution was sufficiently stirred while being heated to dissolve the respective components, thereby preparing a dope.

The obtained dope was heated to 30° C. and was co-cast from a die onto a mirror-finished stainless steel support, which is a drum having a diameter of 3 m, through a casting geeser to form three layers. A first layer in contact with the support was formed from the surface layer dope 1 such that the thickness of the dried film was 6 μm, a second layer was formed from the core layer dope 1 such that the thickness of the dried film was 29 μm, and a third layer was formed from the surface layer dope 2 such that the thickness of the dried film was 5 μm. The surface temperature of the support was set to 4° C., and the casting width was set to 1470 mm. The space temperature of the entire casting portion was set to 15° C. The cellulose ester film which had been cast and rotated was peeled off from the drum at a position 50 cm before an end point of the casting portion when the amount of the residual solvent was 240%, and both ends of the film were clipped with a pin tenter. During peeling, the film was stretched by 6% in the carrying direction. Next, the film was stretched by 5% in the transverse direction of the film (direction perpendicular to the casting direction) while holding the both ends of the film in the transverse direction with a pin tenter (pin tenter illustrated in FIG. 3 of JP1992-1009A (JP-H04-1009A)). The design thickness of the prepared cellulose ester film was set to 40 μm, thereby obtaining a film T1.

[Preparation of Film T2]

(1) Preparation of Cellulose Acylate Resin by Synthesis

A cellulose acylate having an acylation degree of 2.88 was prepared.

Sulfuric acid (7.8 parts by mass with respect to 100 parts by mass of cellulose) as a catalyst was added to the cellulose acylate, and acetic acid was added thereto, followed by acylation reaction at 40° C.

Next, the total substitution degree and the substitution degree in the 6-position were controlled by controlling the amount of the sulfuric acid catalyst, the water content, and the aging time. The acylation degree of the cellulose acylate was obtained by $^{13}$C-NMR using a method described in Carbohydrate. Res. (by Tezuka et. al., 273 (1995), 83-91).

The aging temperature was 40° C. Moreover, the low-molecular weight components of the cellulose acylate were removed by washing with acetone.

(2) Preparation of Dope (Preparation of Cellulose Acylate Solution D-2)

The following composition was put into a mixing tank, was stirred to dissolve the respective components, and was heated to 90° C. for about 10 minutes, followed by filtering through a filter paper having an average pore size of 34 μm and a sintered metallic filter having an average pore size of 10 μm.

| Cellulose Acylate Solution D-2 | |
|---|---|
| Cellulose Acylate Having Acylation Degree of 2.88 | 100.0 Parts By Mass In Total |
| Plasticizer Below (Polycondensed Ester of Dicarboxylic Acid and Diol | 15 Parts By Mass |
| Methylene Chloride | 451.0 Parts By Mass |
| Methanol | 39.0 Parts By Mass |

Plasticizer: Polycondensed ester of adipic acid as a dicarboxylic acid, ethylene glycol as a diol, and 1,2-propylene glycol (adipic acid:ethylene glycol:1,2-propylene glycol=100:70:30 (mass ratio)), terminal: acetyl group, hydroxyl value: 112 mgKOH/g, molecular weight: 1000)

(Preparation of Matting Agent Dispersion)

Next, the following composition containing the cellulose acylate solution D-2 prepared according to the above-described method was put into a disperser, thereby preparing a matting agent dispersion.

| Matting Agent Dispersion M-2 | |
|---|---|
| Matting Agent (AEROSIL R972) | 0.2 Parts By Mass |
| Methylene Chloride | 72.4 Parts By Mass |
| Methanol | 10.8 Parts By Mass |
| Cellulose Acylate Solution D-2 | 10.3 Parts By Mass |

(Preparation of Film Forming Dope)

100 parts by mass of the cellulose acylate solution D-2 was prepared, and the matting agent dispersion M-2 were mixed therewith in an amount where the amount of inorganic fine particles was 0.20 parts by mass with respect to the cellulose acylate resin, thereby preparing a film forming dope.

(3) Casting

The above-described film forming dope was cast using a band casting machine. The band is made of SUS stainless steel.

(4) Drying

A web (film) obtained by casting was peeled off from the band and was dried in a tenter device at 100° C. for 20 minutes, in which the tenter device carries the web while clipping both ends of the web with a clip.

Next, the web was carried into a drying zone and was dried at a drying temperature of 120° C.

The drying temperature described herein refers to the surface temperature of the film.

(5) Winding

Next, after cooling to room temperature, each film was wound, thereby preparing at least 24 rolls having a roll width of 1340 mm and a roll length of 2600 mm under the above-described conditions.

From one of the 24 rolls which had been continuously prepared, a sample (width: 1280 mm) having a length of 1 m was cut out at an interval of 100 m, thereby obtaining a film T2 (thickness: 25 μm).

[Preparation of Film T3]

(Preparation of Cellulose Acylate Solution D-3)

The following respective components were put into a mixing tank and were stirred to dissolve the components, thereby preparing a cellulose acetate dope. The concentration of the cellulose acetate was controlled to 17 mass %, thereby preparing a cellulose acylate solution D-3.

| Cellulose acylate having an acetylation degree of 2.88 | 100 parts by mass |
|---|---|
| Plasticizer P-1 | 12 parts by mass |
| Ultraviolet absorber (UV-1) | 1.8 parts by mass |
| Ultraviolet absorber (UV-2) | 0.8 parts by mass |

The composition of the solvent is as follows.

| Methylene chloride (first solvent) | 92 parts by mass |
|---|---|
| Methanol (second solvent) | 8 parts by mass |

P-1 is a mixture of triphenyl phosphate (TPP)/biphenyl diphenyl phosphate (BDP)=2/1 (mass ratio).

Moreover, 3.6 parts by mass of the following matting agent dispersion M-3 was added to 100 parts by mass of the cellulose acylate solution D-3.

(Matting Agent Dispersion M-3)

| Silica particle dispersion (average particle size: 16 nm) | 0.7 parts by mass |
|---|---|
| Methylene chloride (first solvent) | 75.5 parts by mass |
| Methanol (second solvent) | 6.5 parts by mass |
| Cellulose acylate solution D-3 obtained as above | 17.3 parts by mass |

(Preparation of Cellulose Acylate Film)

The above-described cellulose acylate solution D-3 was cast onto a drum at 20° C. through a casting mouth. When the content of the residual solvent was 20 mass %, a film was peeled off, and the film was dried while fixing both ends of the film in the transverse direction with a tenter clip. Next, the film is carried between rolls of a heat treatment device to be further dried, thereby obtaining a film T3 having a thickness of 25 μm.

[Preparation of Film T4]

A film T4 having a thickness of 60 μm was prepared by changing only the design thickness of the film T3 and using the same dope, matting agent dispersion, and solution film forming device as those of T3.

Preparation of Adhesive and Adhesive Layer (Preparation of Adhesive)

100 parts by mass of isooctyl acrylate, 0.085 parts by mass of 6-hydroxyhexyl acrylate, and 0.4 parts by mass of 2,2'-azobisisobutyronitrile were added to a reactor vessel along with ethyl acetate to obtain a solution, the reactor vessel including a condensor, a nitrogen introducing pipe, a thermometer, and a stirring device. Next, this solution was stirred while blowing nitrogen gas thereto, followed by reaction at 60° C. for 4 hours. As a result, a solution which contains an acrylic polymer PA having a weight average molecular weight of 1750000 was obtained. Moreover, ethyl acetate was added to the solution containing the acrylic polymer, thereby obtaining an acrylic polymer solution of which the solid content concentration was controlled to 30 mass %.

A crosslinking agent ("CORONATE L", manufactured by Nippon Polyurethane Industry Co., Ltd.) which contains a compound having an isocyanate group as a major component; and γ-glycidoxypropyltrimethoxysilane ("KBM-403" (trade name) manufactured by Shin-Etsu Chemical Co., Ltd.) as the silane coupling agent were added to the acrylic polymer solution in this order, in which the amount of the crosslinking agent was as shown in Table 2 and the amount of γ-glycidoxypropyltrimethoxysilane was 0.02 parts by mass with respect to 100 parts by mass of the solid content of the acrylic polymer solution. As a result, an adhesive solution was prepared.

(Formation of Adhesive Layer)

The obtained adhesive solution was uniformly coated using a fountain coater on a separator surface formed of a polyethylene terephthalate film which is surface-treated with a silicone release agent, followed by drying in an air circulation type constant-temperature oven at 155° C. for 5 minutes. As a result, an adhesive layer having a thickness of 15 μm was formed on the separator surface.

(Method of Measuring Creep Amount)

A polarizing plate test specimen (25 mm×50 mm) was bonded to an alkali-free glass plate (size: 50 mm×100 mm, thickness: 1.0 mm) through an adhesive layer such that the adhesive area was 10 mm×25 mm, followed by being left to stand for 1 hour in an environment of a temperature of 25° C. and a relative humidity of 60%. Next, this test specimen was fixed such that a long side of the test specimen faced a vertical direction, and a load of 1 kg was applied to an end of the test specimen for 1 hour in an environment of a temperature of 25° C. and a relative humidity of 60%. At this time, the deviation amount from the initial state was calculated as the creep amount.

TABLE 2

| Adhesive Layer No | Acrylic Polymer PA (Parts By Mass) | CORONATE L (Parts By Mass) | KBM-403 (Parts By Mass) | Thickness of Adhesive Layer (μm) | Creep Amount (μm) |
|---|---|---|---|---|---|
| Ad1 | 100 | 2.8 | 0.02 | 15 | 40 |
| Ad2 | 100 | 2.0 | 0.02 | 15 | 60 |
| Ad3 | 100 | 1.6 | 0.02 | 15 | 90 |
| Ad4 | 100 | 1.2 | 0.02 | 15 | 150 |

[Method of Calculating Shrinkage Force of Polarizing Plate]

In order to measure the elastic modulus (GPa) of each polarizing plate, a polarizing plate sample having a length of 200 mm in a measurement direction and a width of 10 mm on which an adhesive layer was not formed was prepared. Immediately after the sample was left to stand in an environment of a temperature of 40° C. and a relative humidity of 80% for 24 hours and was left to stand in an environment of a temperature of 25° C. and a relative humidity of 10% for 24 hours, the force was measured using STROGRAPH V10-C (manufactured by Toyo Seiki Seisaku-Sho Ltd.) at a chuck interval in the longitudinal direction of 10 cm under a load where the chuck interval was increased at a stretching speed of 10 mm/min. The elastic modulus was calculated from the thickness, force, and elongation of the polarizing plate which were measured in advance using a micrometer.

The humidity dimensional change rate (%) of each polarizing plate can be measured as follows.

A polarizing plate sample having a length (measurement direction) of 12 cm and a width of 3 cm on which an adhesive layer was not formed was prepared. On this sample, pin holes are formed at an interval of 10 cm in an environment of a temperature of 25° C. and a relative humidity of 60%. After the sample was left to stand in an environment of a temperature of 40° C. and a relative humidity of 80% for 24 hours, the interval of the pin holes was measured using a pin gage (the measured value was set as LA1).

Next, immediately after the sample was left to stand in an environment of a temperature of 25° C. and a relative humidity of 10% for 24 hours, the interval of the pin holes was measured using a pin gage (the measured value was set as LC0). Based on these measured values, the humidity dimensional change rate was calculated from the following expression.

Humidity Dimensional Change Rate (%)={($LA1$ (cm)–$LC0$ (cm))/10 (cm)}×100

Based on the humidity dimensional change rate (%) which was calculated from the above expression and the elastic modulus (GPa), the shrinkage force (N/m) of the polarizing plate can be calculated according to the following expression (A).

Shrinkage Force (N/m) of Polarizing Plate in Absorption Axis Direction=Elastic Modulus (GPa) of Polarizing Plate in Absorption Axis Direction× |Humidity Dimensional Change Rate (%) of Polarizing Plate in Absorption Axis Direction|× Thickness (μm) of Polarizing Plate×10

In this expression, the thickness of the polarizing plate refers to the sum of all the thicknesses of the first protective film, the second protective film, and the polarizer.

[Moisture Permeability]

As a method of measuring moisture permeability, a method described in "Kobunshi no Bussei II" (Physical Properties of Polymers II, Kobunshi Jikken Koza 4, Kyoritsu Publishing Co., pp. 285 to 294: measurement of vapor permeation amount (a mass method, a thermometer method, a vapor pressure method, an adsorption amount method)) can be used. A sample having a diameter of 70 mm was obtained by punching a protective film into a circular shape. The sample was humidified for 24 hours in an environment of a temperature of 60° C. and a relative humidity of 95%. Then, using a moisture permeable cup according to JIS Z-0208, the water content per unit area (g/m$^2$) was calculated according to the expression "Moisture Permeability=Mass After Humidification-Mass Before Humidification". The correction of moisture permeability values using a blank cup into which a desiccant was not put was not performed.

[Preparation of Liquid Crystal Display]

A polarizing plate on a viewing side of a commercially available IPS mode liquid crystal display television (42LS5600, manufactured by LG Electronics) was removed, and each polarizing plate shown in Table 3 was bonded thereto such that the adhesive layer is arranged on a liquid crystal cell side. Polarizing plates were arranged to be in a cross Nicol state such that a transmission axis of the polarizing plate on the viewing side matches with the vertical direction; and a transmission axis of a polarizing plate on a backlight side matches with the horizontal direction. The thickness of a glass plate which is used in the liquid crystal cell was 0.5 mm.

[Evaluation of Light Leakage (Display Unevenness) on Four Corners of Liquid Crystal Panel]

One cycle includes the following processes: a process of subjecting a liquid crystal display, which was prepared in each of Examples and Comparative Examples, to a thermotreatment for 24 hours in an environment of a temperature of 40° C. and a relative humidity of 80%; and a process of allowing the liquid crystal display to be left to stand for 24 hours in an environment of a temperature of 25° C. and a relative humidity of 60% while a backlight of the liquid crystal display was being turned on. This cycle was repeated. In the 5th cycle, after the liquid crystal display was left to stand for 24 hours in an environment of a temperature of 40° C. and a relative humidity of 80% and was left to stand for 6 hours and 24 hours in an environment of a temperature of 25° C. and a relative humidity of 60%, the light leakage on the four corners of the panel was evaluated to evaluate display unevenness.

By imaging a black display screen from the front side of the screen using a brightness measuring camera "ProMetric" (manufactured by Radiant Imaging Inc.), the light leakage was evaluated based on the average brightness of the entire screen; and a brightness difference of a portion where the light leakage on the four corners was large.

(Evaluation Criteria)

A: No light leakage was observed on the four corners of the panel (the light leakage of the panel is approximately the same as that of the initial state)

B slight amount of light leakage was observed on one or two of the four corners of the panel, which was allowable C slight amount of light leakage was observed on three or four of the four corners of the panel, which was allowable D large amount of light leakage was observed on the four corners of the panel, which was not allowable

[Evaluation of Adhesion of Polarizing Plate]

A sample having a length of 1 m in an absorption axis direction was cut out from each polarizing plate which was humidified in an environment of a temperature of 25° C. and a relative humidity of 60%. The sample was bonded to a thick glass plate (which was not warped) through an adhesive layer.

One cycle includes the following processes: a process of subjecting the liquid crystal glass with the polarizing plate to a thermotreatment for 24 hours in an environment of a temperature of 40° C. and a relative humidity of 80%; and a process of allowing the liquid crystal display to be left to stand for 24 hours in an environment of a temperature of 25° C. and a relative humidity of 10%. This cycle was repeated 10 times.

Next, whether a bonding interface between the polarizing plate and the glass plate was peeled off or not was observed for evaluation.

(Evaluation Criteria)

A: No Peeling was observed

B small peeling portion having a width of 1 mm or less was observed at an end of the sample, which had no problems in practice C peeling portion having a width of greater than 1 mm and 2 mm or less was observed at an end of the sample, which had no problems in practice D peeling portion having a width of greater than 2 mm was observed at an end of the sample, which had a problem in practice

TABLE 3

| Polarizing Plate No | | | Comp. Ex. 1 | Ex. 2 | Ex. 3 | Ex. 4 | Ex. 5 | Ex. 6 | Ex. 7 | Ex. 8 | Ex. 9 | Comp. Ex. 10 | Comp. Ex. 11 |
|---|---|---|---|---|---|---|---|---|---|---|---|---|---|
| Configuration of Polarizing Plate | Viewing Side Protective Film | Kind | LA1 | LA1 | LA3 | LA1 | LA2 | LA1 | LA1 | LA1 | LA1 | LA1 | T4 |
| | | Thickness (μm) | 40 | 40 | 42 | 40 | 35 | 40 | 40 | 40 | 40 | 40 | 60 |
| | Polarizer | Kind | P1 | P2 | P2 | P2 | P2 | P3 | P2 | P2 | P2 | P3 | P2 |
| | | Thickness (μm) | 28 | 16 | 16 | 16 | 16 | 10 | 16 | 16 | 16 | 10 | 16 |
| | Cell Side Protective Film | Kind | T1 | T1 | T1 | T2 | T2 | T2 | T3 | T3 | T1 | T2 | T3 |
| | | Thickness (μm) | 40 | 40 | 40 | 25 | 25 | 25 | 25 | 25 | 40 | 25 | 40 |
| | Adhesive Layer | Kind | Ad3 | Ad3 | Ad3 | Ad3 | Ad3 | Ad3 | Ad3 | Ad4 | Ad3 | Ad1 | Ad3 |
| | | Thickness (μm) | 15 | 15 | 15 | 15 | 15 | 15 | 15 | 15 | 15 | 15 | 15 |
| Moisture Permeability (g/m²/24 hours) of Viewing Side Protective Film | | | 94 | 94 | 31 | 94 | 65 | 94 | 94 | 94 | 94 | 94 | 567 |
| Creep Amount (μm) of Adhesive Layer | | | 90 | 90 | 90 | 90 | 90 | 40 | 60 | 90 | 90 | 150 | 90 |

TABLE 3-continued

| Polarizing Plate No | | Comp. Ex. 1 | Ex. 2 | Ex. 3 | Ex. 4 | Ex. 5 | Ex. 6 | Ex. 7 | Ex. 8 | Ex. 9 | Comp. Ex. 10 | Comp. Ex. 11 |
|---|---|---|---|---|---|---|---|---|---|---|---|---|
| Polarizing Plate | Total Thickness (μm) | 108 | 96 | 98 | 81 | 76 | 75 | 75 | 75 | 81 | 81 | 101 |
| | Elastic Modulus (GPa) in Absorption Axis Direction | 8.1 | 6.6 | 6.5 | 7 | 69 | 6 | 6 | 6 | 6.8 | 6.8 | 6.8 |
| | Dimensional Change Rate (%) in Absorption Axis Direction | 0.33 | 0.31 | 0.17 | 0.32 | 0.26 | 0.31 | 0.31 | 0.31 | 0.32 | 0.32 | 0.57 |
| | Shrinkage Force (N/m) in Absorption Axis Direction | 2891 | 1991 | 1100 | 1825 | 1375 | 1375 | 1375 | 1375 | 1780 | 1780 | 3888 |
| Evaluation | Light Leakage (After 6 Hours) | A | A | A | A | A | A | A | A | A | A | B |
| | Light Leakage (After 24 Hours) | D | C | A | B | A | A | A | A | B | D | D |
| | Adhesion of Polarizing Plate | C | B | A | B | A | A | A | A | B | C | D |

This application claims priority under 35 U.S.C. §119 of Japanese Patent application JP 2012-222481, filed on Oct. 4, 2012, and Japanese Patent application JP 2013-053453, filed on Mar. 15, 2013, the entire contents of which are hereby incorporated by reference.

What is claimed is:

1. A polarizing plate comprising: a first protective film; a polarizer; a second protective film; and an adhesive layer in this order,
    wherein a moisture vapor permeability of the first protective film is less than or equal to 100 g/m$^2$/24 hours,
    the second protective film contains cellulose acylate as a major component,
    a creep amount of the adhesive layer is less than 100 μm when measured in a creep test under conditions of a temperature of 25° C., a relative humidity of 60%, a load of 1 kg, and a load applying time of 1 hour, and
    a shrinkage force of the polarizing plate in an absorption axis direction thereof which is represented by the following expression (A) is lower than or equal to 2000 N/m, Shrinkage Force (N/m) of Polarizing Plate in Absorption Axis Direction=Elastic Modulus (GPa) of Polarizing Plate in Absorption Axis Direction× |Humidity Dimensional Change Rate (%) of Polarizing Plate in Absorption Axis Direction|× Thickness (μm) of Polarizing Plate×10.   Expression (A)

2. The polarizing plate according to claim 1, wherein the first protective film contains a (meth)acrylic resin as a major component.

3. The polarizing plate according to claim 2, wherein the creep amount of the adhesive layer is 10 μm to 90 μm.

4. The polarizing plate according to claim 3, wherein the thickness of the polarizing plate is 1 μm to 20 μm.

5. The polarizing plate according to claim 4, wherein the thickness of the second protective film is 10 μm to 35 μm.

6. The polarizing plate according to claim 1, wherein the creep amount of the adhesive layer is 10 μm to 90 μm.

7. The polarizing plate according to claim 1, wherein the thickness of the polarizing plate is 1 μm to 20 μm.

8. The polarizing plate according to claim 1, wherein the thickness of the second protective film is 10 μm to 35 μm.

9. The polarizing plate according to claim 1, wherein the thickness of the adhesive layer is 5 μm to 20 μm.

10. The polarizing plate according to claim 1, which is used as a polarizing plate for a viewing side of a liquid crystal display.

11. A liquid crystal display comprising:
    the polarizing plate according to claim 1 that is arranged on a viewing side of a liquid crystal cell,
    wherein the adhesive layer included in the polarizing plate is arranged opposite the liquid crystal cell side.

12. The liquid crystal display according to claim 11, wherein the thickness of a glass substrate included in the liquid crystal cell is less than or equal to 0.5 mm.

13. The liquid crystal display according to claim 12, which is an IPS mode liquid crystal display.

14. The liquid crystal display according to claim 11, which is an IPS mode liquid crystal display.

* * * * *